United States Patent
Furuhashi et al.

(10) Patent No.: US 7,096,336 B2
(45) Date of Patent: Aug. 22, 2006

(54) INFORMATION PROCESSING SYSTEM AND MANAGEMENT DEVICE

(75) Inventors: Ryoji Furuhashi, Yokohama (JP); Yasunori Kaneda, Sagamihara (JP); Masafumi Nozawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 10/828,306

(22) Filed: Apr. 21, 2004

(65) Prior Publication Data

US 2005/0154821 A1 Jul. 14, 2005

(30) Foreign Application Priority Data

Jan. 9, 2004 (JP) .............................. 2004-003981

(51) Int. Cl.
G06F 12/00 (2006.01)
G06F 3/33 (2006.01)

(52) U.S. Cl. .................. 711/165; 711/114; 711/170; 710/1; 707/205

(58) Field of Classification Search ................ 711/165, 711/114, 170; 710/1, 15, 226; 707/205
See application file for complete search history.

(56) References Cited

U.S. PATENT DOCUMENTS

| | | | |
|---|---|---|---|
| 5,893,139 A * | 4/1999 | Kamiyama | 711/117 |
| 6,032,224 A | 2/2000 | Blumenau | |
| 6,189,001 B1 | 2/2001 | McGovern et al. | |
| 6,446,161 B1 | 9/2002 | Yamamoto et al. | |
| 2002/0004857 A1 | 1/2002 | Arakawa et al. | |
| 2002/0144076 A1 | 10/2002 | Yamamoto et al. | |
| 2003/0004981 A1 | 1/2003 | Kaneda et al. | |
| 2003/0225801 A1 | 12/2003 | Devarakonda et al. | |
| 2003/0229698 A1 | 12/2003 | Furuhashi et al. | |
| 2004/0123180 A1 | 6/2004 | Soejima et al. | |
| 2004/0243692 A1 | 12/2004 | Arnold et al. | |
| 2005/0027754 A1 | 2/2005 | Gajjar et al. | |
| 2005/0160227 A1 | 7/2005 | Todd et al. | |

OTHER PUBLICATIONS

SNIA Storage Management Initiative Specification, version 1.0.1, Abstract, 2003, pp. iii-vi; p. 187.
D. Patterson, A Case for Redundant Arrays of Inexpensive Disks (RAID), Computer Science Division, 1988, pp. 109-116.

* cited by examiner

Primary Examiner—Kimberly McLean-Mayo
(74) Attorney, Agent, or Firm—Mattingly, Stanger, Malur & Brundidge, P.C.

(57) ABSTRACT

In an information processing system including a computer device and a storage device storing data used by the computer device, the region in which the data is held is managed in association with a change, over the passage of time, in the performance and availability required of the data holding region.

The computer device includes a storage device managing unit for managing the storage device which stores data used by the computer device. The storage device managing unit periodically monitors temporal characteristics information, and moves data, if the storage region having functional characteristics corresponding to the temporal characteristics information is different from the storage region to which the data is currently assigned.

14 Claims, 20 Drawing Sheets

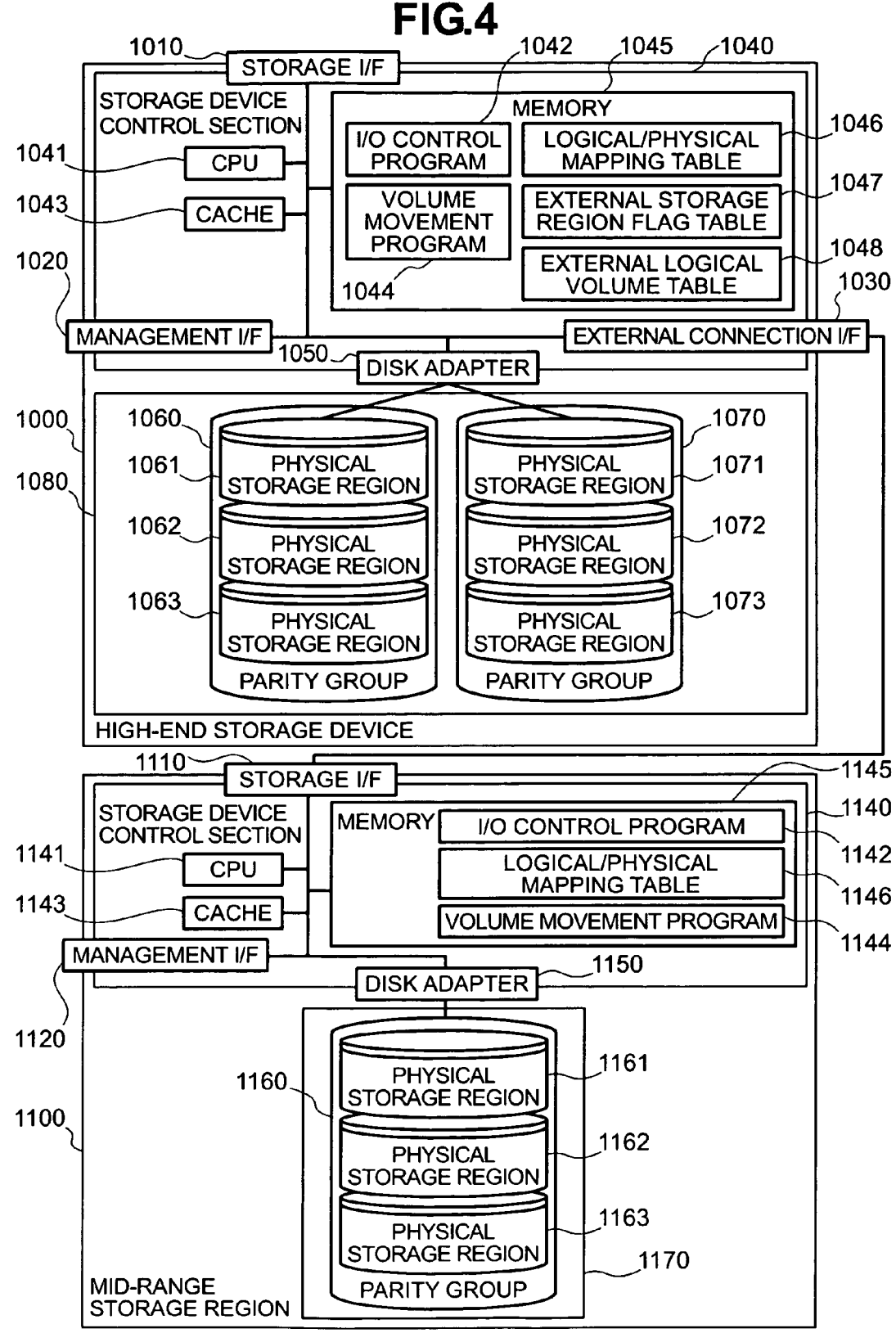

| LOGICAL VOLUME ID | PARITY GROUP ID | PHYSICAL STORAGE REGION ID | ADDRESS IN PHYSICAL STORAGE REGION |
|---|---|---|---|
| Volume1 | 1060 | 1061 | 0~1023 |
| Volume2 | 1060 | 1063 | 0~1023 |
| Volume4 | 1070 | 1072 | 0~1023 |
| Volume6 | 1070 | 1072 | 1024~2047 |

| LOGICAL VOLUME ID | EXTERNAL STORAGE REGION FLAG |
|---|---|
| Volume1 | 0 |
| Volume2 | 0 |
| Volume3 | 1 |
| Volume4 | 0 |
| Volume5 | 1 |
| Volume6 | 0 |

| LOGICAL VOLUME ID | STORAGE DEVICE ID | EXTERNAL LOGICAL VOLUME ID |
|---|---|---|
| Volume3 | 1100 | Volume1 |
| Volume5 | 1100 | Volume2 |

| LOGICAL VOLUME ID | PARITY GROUP ID | PHYSICAL STORAGE REGION ID | ADDRESS IN PHYSICAL STORAGE REGION |
|---|---|---|---|
| Volume1 | 1160 | 1161 | 0~1023 |
| Volume2 | 1160 | 1163 | 0~1023 |

| STORAGE DEVICE ID | PHYSICAL STORAGE REGION ID | BACK-UP DEVICE ID | BACK-UP DEVICE CHARACTERISTICS |
|---|---|---|---|
| 1000 | 1061 | 2000 | HIGH-SPEED |
| 1000 | 1062 | 2000 | HIGH-SPEED |
| 1000 | 1063 | 2100 | LOW-SPEED |
| 1000 | 1071 | 2000 | HIGH-SPEED |
| 1000 | 1072 | 2000 | HIGH-SPEED |
| 1000 | 1073 | 2100 | LOW-SPEED |
| 1100 | 1161 | 2000 | HIGH-SPEED |
| 1100 | 1162 | 2000 | HIGH-SPEED |
| 1100 | 1163 | 2100 | LOW-SPEED |

| STORAGE DEVICE ID | PHYSICAL STORAGE REGION ID |
|---|---|
| 1000 | 1061 |
| 1000 | 1071 |
| 1100 | 1161 |

| STORAGE DEVICE ID | PHYSICAL STORAGE REGION ID |
|---|---|
| 1000 | 1061 |
| 1000 | 1062 |
| 1000 | 1163 |

FIG.11

| STORAGE DEVICE ID | PHYSICAL STORAGE REGION ID | PERFORMANCE CHARACTERISTICS | AVAILABILITY CHARACTERISTICS |
|---|---|---|---|
| 1000 | 1061 | HIGH | HIGH |
| 1000 | 1062 | HIGH | MEDIUM |
| 1000 | 1063 | HIGH | LOW |
| 1000 | 1071 | MEDIUM | HIGH |
| 1000 | 1072 | MEDIUM | MEDIUM |
| 1000 | 1073 | MEDIUM | LOW |
| 1100 | 1161 | LOW | HIGH |
| 1100 | 1162 | LOW | MEDIUM |
| 1100 | 1163 | LOW | LOW |

| PERFORMANCE CHANGE CHARACTERISTICS ID | ESTABLISHED DATE/TIME NAME | ESTABLISHED DATE/TIME | VOLUME CHANGE INFORMATION ID | PERFORMANCE CHANGE GRAPH ID |
|---|---|---|---|---|
| 1 | STORAGE CONDITIONS CHANGE DATE | 2008/7/15 | 1 | 1 |
| 2 | — | — | 2 | 2 |
| 3 | AUDIT DATE | 2004/6/30 | 3 | 3 |
| 4 | AUDIT DATE | 2004/9/30 | 3 | 3 |

| VOLUME MOVEMENT INFORMATION (PERFORMANCE) ID | MOVEMENT NO. | MOVEMENT DATE/TIME | MOVEMENT DESTINATION PERFORMANCE CHARACTERISTICS |
|---|---|---|---|
| 1 | 1 | UPON CREATION | HIGH |
| | 2 | (ESTABLISHED DATE/TIME - CREATION DATE/TIME) / 3 | MEDIUM |
| | 3 | (ESTABLISHED DATE/TIME - CREATION DATE/TIME) × 2/3 | LOW |
| 2 | 1 | UPON CREATION | MEDIUM |
| 3 | 1 | UPON CREATION | LOW |
| | 2 | ESTABLISHED DATE/TIME - 3 | HIGH |
| | 3 | ESTABLISHED DATE/TIME + 1 | LOW |

| AVAILABILITY CHANGE CHARACTERISTICS ID 50501 | ESTABLISHED DATE NAME 50502 | ESTABLISHED DATE/TIME 50503 | VOLUME MOVEMENT INFORMATION ID 50504 | AVAILABILITY CHANGE GRAPH ID 50505 |
|---|---|---|---|---|
| 1 | FILING CONDITIONS CHANGE DATE | 2008/7/15 | 1 | 1 |
| 2 | FILING CONDITIONS CHANGE DATE | 2005/7/15 | 2 | 2 |
| 3 | MONITORING DATE | 2004/6/30 | 3 | 3 |
| 4 | MONITORING DATE | 2004/9/30 | 3 | 3 |

5050

(B)

| VOLUME MOVEMENT INFORMATION (AVAILABILITY) ID 50515 | MOVEMENT NO. 50516 | MOVEMENT DATE/TIME 50517 | MOVEMENT DESTINATION AVAILABILITY CHARACTERISTICS 50518 |
|---|---|---|---|
| 1 | 1 | UPON CREATION | HIGH |
| | 2 | (ESTABLISHED DATE/TIME - CREATION DATE/TIME) / 3 | MEDIUM |
| | 3 | (ESTABLISHED DATE/TIME - CREATION DATE/TIME) × 2/3 | LOW |
| 2 | 1 | UPON CREATION | HIGH |
| | 2 | ESTABLISHED DATE/TIME | LOW |
| 3 | 1 | UPON CREATION | LOW |
| | 2 | (ESTABLISHED DATE/TIME - CREATION DATE/TIME) / 3 | MEDIUM |
| | 3 | (ESTABLISHED DATE/TIME - CREATION DATE/TIME) × 2/3 | HIGH |
| | 4 | ESTABLISHED DATE/TIME + 1 | LOW |

| DATA ATTRIBUTE NAME | PERFORMANCE CHANGE CHARACTERISTICS ID | AVAILABILITY CHANGE CHARACTERISTICS ID |
|---|---|---|
| AUDIT DATA WITH ESTABLISHED DATE/TIME 6/30 | 3 | 3 |
| MAIL LOG WITH ESTABLISHED DATE/TIME 7/15 | 1 | 2 |
| AUDIT DATA WITH ESTABLISHED DATE/TIME 9/30 | 3 | 3 |

LOGICAL VOLUME ALLOCATION SCREEN — 9000

LOGICAL VOLUME ID [ Volume1 ▽ ] — 9100

DATA ATTRIBUTE NAME [ AUDIT DATA ▽ ] — 9200

PERFORMANCE CHANGE CHARACTERISTICS (Graph: REQUIRED PERFORMANCE vs TIME, peak at AUDIT DATE 2004/6/30)

AVAILABILITY CHANGE CHARACTERISTICS (Graph: REQUIRED AVAILABILITY vs TIME, peak at AUDIT DATE 2004/6/30)

[ OK ] — 9700

| LOGICAL VOLUME ID | DATA ATTRIBUTE |
|---|---|
| Volume1 | AUDIT DATA WITH ESTABLISHED DATE/TIME 6/30 |
| Volume2 | MAIL LOG WITH ESTABLISHED DATE/TIME 7/15 |

| FILE NAME | STORAGE DEVICE ID | PHYSICAL STORAGE REGION ID | ADDRESS IN PHYSICAL STORAGE REGION |
|---|---|---|---|
| AUDIT DOCUMENT.doc | 1100 | 1163 | 0~1023 |
| maillog.mbx | 1000 | 1061 | 0~1023 |

| LOGICAL VOLUME | DATA TYPE | CREATION DATE | ESTABLISHED DATE | MOVEMENT DATE/TIME | PHYSICAL STORAGE REGION | |
|---|---|---|---|---|---|---|
| | | | | | PERFORMANCE | AVAILABILITY |
| 1 | AUDIT | 2004/1/1 | 2004/6/30 | 2004/1/1 | LOW | LOW |
| | | | | 2004/2/29 | LOW | MEDIUM |
| | | | | 2004/4/30 | LOW | HIGH |
| | | | | 2004/6/27 | HIGH | HIGH |
| | | | | 2004/7/1 | LOW | LOW |
| 2 | MAIL LOG | 2003/12/31 | 2006/12/31 | 2003/12/31 | HIGH | HIGH |
| | | | | 2004/12/31 | MEDIUM | HIGH |
| | | | | 2005/12/31 | LOW | LOW |
| ... | | | | | | |

INFORMATION PROCESSING SYSTEM AND MANAGEMENT DEVICE

CROSS-REFERENCE TO RELATED APPLICATIONS

This application relates to and claims priority from Japanese Patent Application No. 2004-003981, filed on Jan. 9, 2004, the entire disclosure of which is incorporated herein by reference.

BACKGROUND OF THE INVENTION

The present invention relates to an information processing device, comprising a computer device, and a storage device for storing data used by the computer device, wherein data is relocated between a plurality of storage devices in accordance with a change in the characteristics of the data with the passage of time.

There are, disk array systems which achieve high-speed operation and high reliability by providing a plurality of disk devices in an array fashion, in a single two-dimensional storage system for an information processing system. The disk devices have distributed access and are operated in a parallel fashion, thus providing redundancy for the stored data.

A disk array system provided with redundancy is assigned various RAID levels, from RAID level 1 to level 5, according to the redundancy structure (for example, see the below-listed Non-Patent Reference 1), and data transmitted from a host computer connected to the disk array system is located in a plurality of disk devices, in accordance with the RAID level.

In a disk array system, the logical storage region that is recognized when the system is accessed by a host computer is associated with a physical storage region indicating an actual storage region in the disk device, in such a manner that the host computer is not aware of the fact that the data is stored in a distributed fashion in a plurality of disk devices.

When constructing a disk array system of this kind, in order to achieve optimal cost performance, disk devices of differing storage capacities and differing characteristics may be used in combination. In a case of this kind, desirably, the data transmitted by the host computer and located hypothetically in a logical storage region is stored in the physical storage region provided by the most suitable disk device, on the basis of indicators relating to access frequency and access patterns, and the like.

In a system which combines disk devices of different characteristics, the method used for allocating the data to the physical storage region provided by the most suitable disk device involves, for example, technology whereby the data access frequency is monitored and data is moved to the most suitable physical region on the basis of the access frequency (see, for example, the below-listed Patent Reference 1.)

In the technology disclosed in Patent Reference 1, a threshold value is set previously, the frequency of access to the data is monitored, and if the access frequency has exceeded the threshold value, then the data is moved to a physical storage region provided by the disk device operating at a higher speed. Furthermore, it is also possible to relocate the actual logical storage region itself, wherein the disk array system monitors the conditions of the access load to the respective logical storage regions from the host computer, and determines the details of the relocation in such a manner that the data is optimally located after relocation, in accordance with the results of the load monitoring. When the logical storage region has been relocated, the association between the logical storage region and the physical storage region is changed to the physical storage region after relocation.

Furthermore, there is also technology for performing relocation wherein the use status of a disk device corresponding to read/write operations from the host computer is gathered, the disk access is predicted from the information thus gathered, and the most suitable disk device for locating the data is determined (see, for example, the below-listed Patent Reference 2).

Moreover, in a document relating to SMI-S (Storage Management Initiative Specification) under deliberation by the SNIA (Storage Networking Industry Association), which is a storage industry group, technology for a storage system consisting of a disk array system is described, wherein a logical storage region is assigned to a physical storage region provided by a disk device, in accordance with previously determined "hints" which indicate the access characteristics for the data (see, for example, the below-listed Non-Patent Reference 2). The storage system conforming to SMI-S is equipped with functions for selecting a physical storage region on the basis of a "hint" and assigning a logical storage region to the same.

(Non-Reference Patent 1) D. Patterson, G. Gibson and R. H. Kartz, "A Case for Redundant Arrays of Inexpensive Disks (RAID)" (ACM SIGMOD, June 1988, pp. 109–116)

Reference Patent 1: Japanese Patent Laid-open No. (Hei) 9-274544

Reference Patent 2: Japanese Patent Laid-open No. 2002-82775

(Non-Patent Reference 2) "SMI-S Specification Public Review Draft" p. 157 (SNIA, 2003)

(Problems to be Solved by the Invention)

A storage system which moves data in accordance with various circumstances in the above-described manner provides a method for achieving optimal location of the data.

However, in the technology disclosed in Patent Reference 1, as described previously, the logical storage regions are monitored, and relocation of data starts at the time that the load has exceeded a threshold value. Since relocation of the data takes time to carry out, in cases where there is a sudden increase in disk access, the data relocation is not completed in time, and, hence, the benefits of relocation cannot be obtained. Moreover, since the data relocation process generates a large number of disk access operations, then while relocation is being executed, the disk access operations required for data relocation are added to the normal disk access operations, and, hence, the overall efficiency declines.

In the technology disclosed in Patent Reference 2, the future data access characteristics are predicted on the basis of past disk access characteristics, and, therefore, relocation is carried out in advance, in accordance with the predictions made. However, it is only possible to respond by means of predictions based on past history in cases where the same change characteristics are generated in a continuous fashion, at uniform time intervals. Even if the change characteristics are the same, for example, in many cases, disk access occurs in an irregular manner over time, and, therefore, it is not necessarily possible to predict the most suitable time for relocation of data, on the basis of past disk access characteristics. Therefore, in the technology disclosed in Patent Reference 2, data is not necessarily relocated in an optimal fashion, as desired.

On the other hand, there is also the method whereby "hints" defined according to SMI-S are provided when creating a new logical volume. However, the SMI-S indicates how existing logical storage regions are to be used in the future, and it does not consider processing for determining the time at which a logical storage region is to be relocated, or the destination to which it is to be relocated.

SUMMARY OF THE INVENTION

The present invention was devised with the foregoing situation in view, an object thereof being to provide technology, for a storage sub-system comprising a plurality of storage devices having different characteristics, whereby data is located in the storage device offering the most suitable physical storage region, in accordance with the change of characteristics over time, and the like, required of the physical storage region where the data is to be stored.

In order to achieve the aforementioned object, the present invention is provided with a storage device management device for managing a storage device having a plurality of physical storage regions for storing data used by a computer device.

The storage device managing device comprises: physical storage region characteristics managing means for managing the level of storage characteristics provided by each of the plurality of physical storage regions; data storage destination managing means for managing the plurality of physical storage regions and the data stored in each physical storage region, by creating associations between the same; characteristics change managing means for managing the previously determined temporal change in the level of the storage characteristics required of the storage destination physical storage region by the data managed by the data storage destination managing means; and movement instructing means for acquiring, at prescribed times, the level of storage characteristics in the storage destination required by the data at that time, for each data item managed by the data storage destination managing means, further acquiring the level of storage characteristics of the physical storage region in which the data is actually stored, from the physical storage region characteristics managing means, comparing the respective levels, and issuing an instruction to the storage device for the data to be moved to the physical storage region providing the required storage characteristics.

(Merits of the Invention)

In an information processing system comprising a computer device, and a plurality of storage devices having different characteristics, in which data used by the computer device is stored, it is possible to locate data in a storage device providing an optimal physical storage region, at an optimal timing, in accordance with a temporal change in the characteristics required of the physical storage region, and the like.

Further characteristics of the present invention will become apparent from the following description and the accompanying drawings.

BRIEF DESCRIPTION OF THE DRAWINGS

FIG. 4 is a block diagram of a high-end storage device and mid-range storage device according to the first embodiment of the invention;

FIGS. 5A to 5D show tables located in the memories of respective storage device control sections of a high-end storage device and a mid-range storage device according to the first embodiment of the invention, wherein FIG. 5A is a diagram of the composition of a logical/physical mapping table, FIG. 5B is a diagram of the composition of an external storage region flag table, FIG. 5C is a diagram of the composition of an external logical volume table, and FIG. 5D is a diagram of the composition of a logical/physical mapping table of a mid-range storage device;

FIG. 8 is a diagram showing the composition of a data back-up table according to the first embodiment of the invention;

FIG. 9 is a diagram showing the composition of a replication table according to the first embodiment of the invention;

FIG. 10 is a diagram showing the composition of a cache control table according to the first embodiment of the invention;

FIG. 11 is a diagram showing the composition of a physical storage region characteristics table according to the first embodiment of the invention;

FIG. 12A is a diagram showing the composition of a performance change characteristics table according to a first embodiment of the invention, and FIG. 12B is a diagram showing the composition of the volume movement information table (performance) according to a first embodiment of the invention;

FIG. 14(A) is a diagram showing the composition of an availability change characteristics table according to the first embodiment of the invention, and FIG. 14(B) is a diagram showing the composition of a volume movement information table (availability) according to the first embodiment of the invention;

FIG. 16 is a diagram showing the composition of data attribute/change characteristics table according to the first embodiment of the invention;

FIG. 17 is a diagram illustrating one example of a logical volume allocation screen according to the first embodiment of the invention;

FIG. 24 is a diagram showing the composition of a movement schedule table according to the first embodiment of the invention.

DESCRIPTION OF THE PREFERRED EMBODIMENTS

First Embodiment

Below, a first embodiment of the present invention will be described.

Before describing the detailed composition, and the like, of the present embodiment, an overview of the processing according to the present embodiment will be described with reference to FIG. 1 and FIG. 2. In the present embodiment, the access destination recognized by the host computer (application server) is called a "logical volume".

Figure 1:
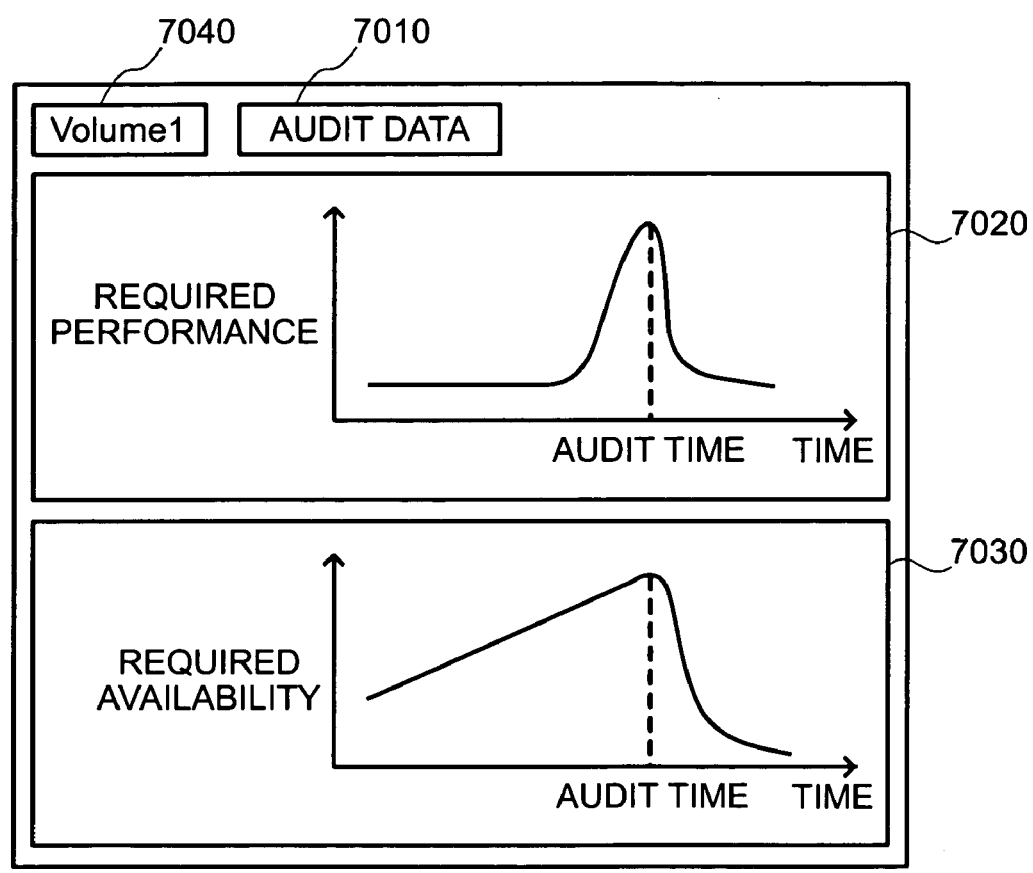
FIG. 1 is a diagram illustrating an overview of the processing according to a first embodiment of the invention.

FIG. 1 is a diagram which will be referred to for the purpose of describing a particular logical volume, the data attribute of data located in that logical volume, and the temporal change in the characteristics required of a physical storage region forming a storage destination for data having those data attributes.

The data attribute 7010 is a name assigned to a state of temporal change in the characteristics required of a physical storage region by the data stored in the logical volume in question. Various representative data names are assigned, indicating the particular circumstances of the change. For example, names, such as monitoring data, mail log data, or the like, are assigned. In the present embodiment, the performance indicating the access speed and the availability indicating the speed of recovery, are considered as characteristics required of the physical storage region by the data.

The performance change characteristics graph 7020 is a graph showing the temporal change of the performance required of the physical storage region, by data that corresponds to the data attribute 7010. The vertical axis shows the required performance and the horizontal axis shows time.

The availability change characteristics graph 7030 is a graph showing is the temporal change of the availability required of the physical storage region, by data that corresponds to the data attribute 7010. The vertical axis shows the required performance and the horizontal axis shows time.

The logical volume ID 7040 is an identifier for the logical volume in which data having the data attribute 7010 is stored.

Figure 2:
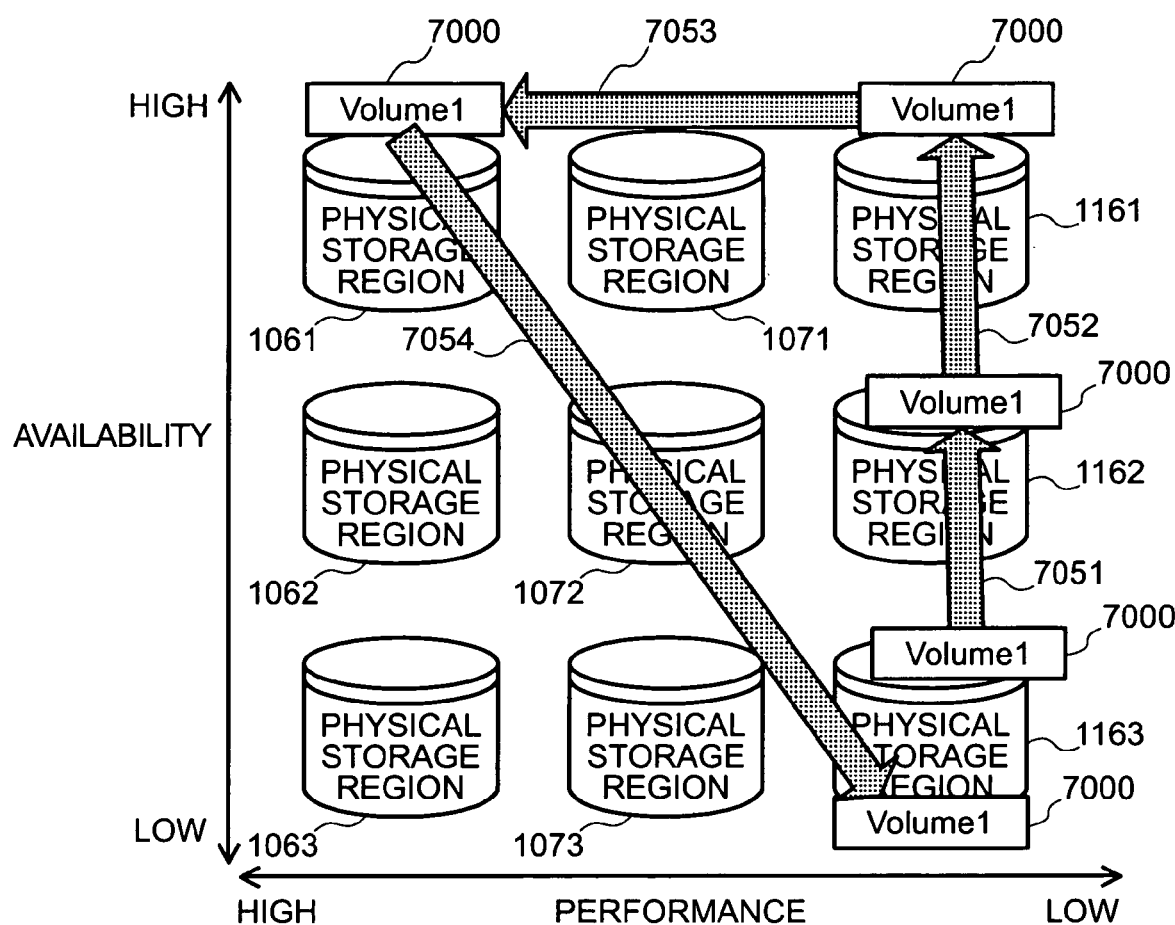
FIG. 2 is a diagram illustrating the movement of logical volumes according to the first embodiment of the invention.

FIG. 2 is a diagram which illustrates a situation where the logical volume, in which the data having the data attribute shown in FIG. 1 is stored, moves between physical storage regions of the storage device in accordance with previously determined temporal change in the performance and availability required of the physical storage region by the data in question.

Initially the logical volume 7000 identified by the logical volume ID 7040 is assigned to a physical storage region 1163 having both a low performance and a low availability. Thereupon, in order to respond to the increase in the required availability, over the passage of time, as indicated by the availability change characteristics graph 7030, the logical volume 7000 moves to the physical storage region 1162, which has a low performance and a medium availability (movement step 7051).

Thereupon, in order to respond to a further increase in the required availability, in accordance with the availability change characteristics graph 7030, the logical volume 7000 moves to the physical storage region 1161 which has a low performance and a high availability (movement step 7052).

Thereupon, in order to respond to a sudden increase in the required performance, in accordance with the performance change characteristics graph 7020, the logical volume 7000 moves to a physical storage region 1061 which has both a high performance and a high availability (movement step 7053).

Thereupon, in order to respond to a sudden decrease in the required performance, in accordance with the performance change characteristics graph 7020, and a sudden decrease in the required availability in accordance with the availability change characteristics graph 7030, the logical volume 7000 moves to the physical storage region 1163 which has both a low performance and a low availability (movement step 7054).

The composition and processing procedure required in order to achieve movement of the logical volume of this kind will be described in detail.

(System Composition)

Figure 3:
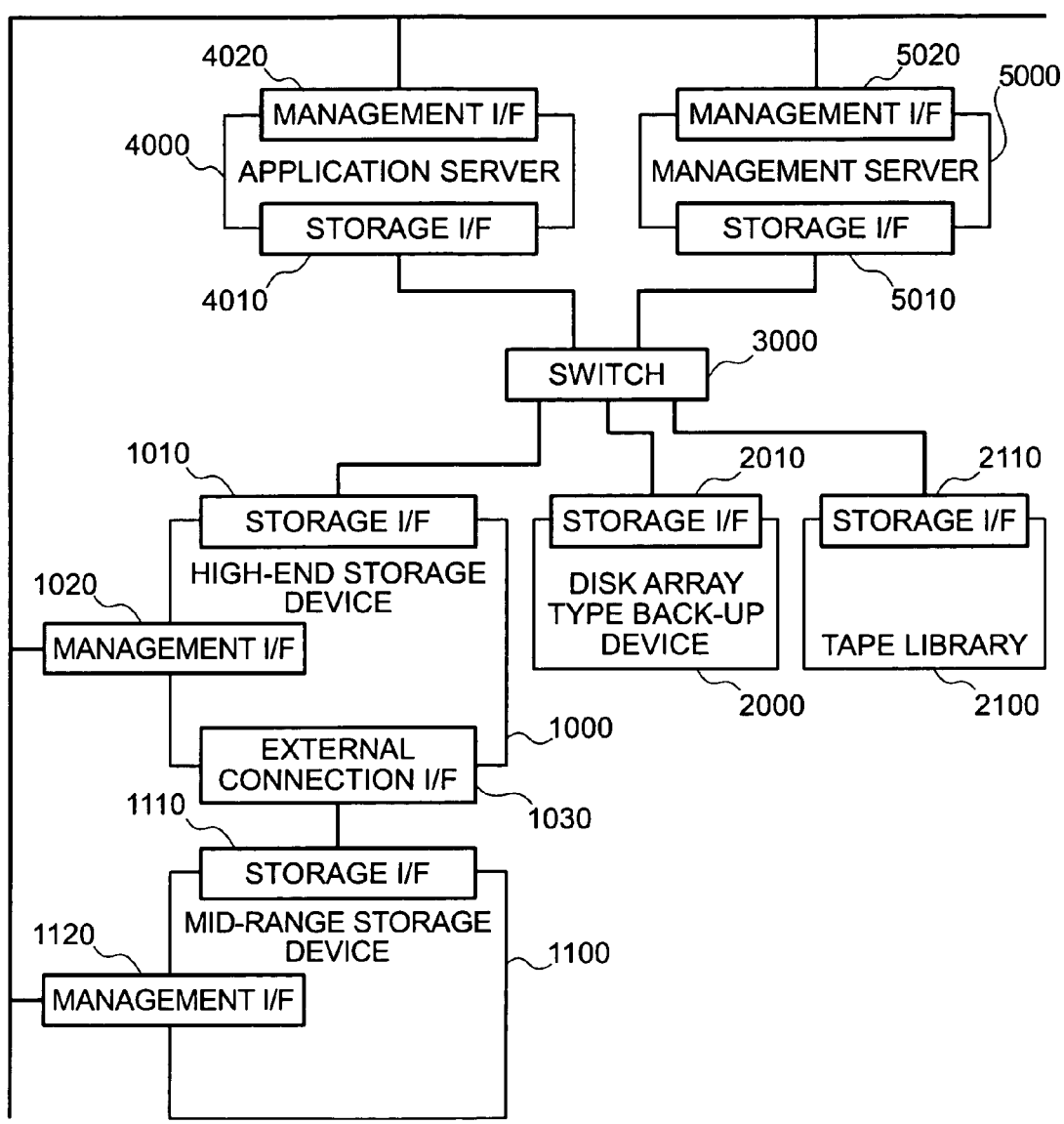
FIG. 3 is a block diagram of an information processing system according to the first embodiment of the invention.

FIG. 3 is a block diagram of an information processing system according to the present embodiment.

As shown in this diagram, the information processing system according to the present embodiment comprises a high-end storage device 1000, a mid-range storage device 1100, a disk array type back-up device 2000, a tape library 2100, a switch 3000, an application server 4000, and a management server 5000.

The high-end storage device 1000 is a storage device which stores data used by the application server 4000. The high-end storage device 1000 is connected to the switch 3000 via a storage I/F 1010. Moreover, the high-end storage device 1000 is also connected to the mid-range storage device 1100 by means of an external connection I/F 1030 and a storage I/F 1110.

The mid-range storage device 1100 is a storage device which stores data used by the application server 4000. The mid-range storage device 1100 is connected to the high-end storage device 1000 via a storage I/F 1110 and the external connection I/F 1030. The application server 4000 performs access via the high-end storage device 1000, whenever it is to use data stored in the mid-range storage device 1100.

The high-end storage device 1000 is able to handle the storage region of the mid-range storage device 1100 in the same manner as a storage region contained in the high-end storage device 1000. Therefore, the application server 4000 is able to handle a storage region of the mid-range storage device 1100 in the same manner as a storage region of the high-end storage device 1000. In the present embodiment, the high-end storage device 1000 has a higher performance, as will be described hereinafter, than the mid-end storage device 1000.

The disk array type back-up device 2000 constitutes a device for backing up the data stored in the high-end storage device 1000 and the mid-range storage device 1100. The disk array type back-up device 2000 is connected to the high-end storage device 1000 by means of a storage I/F 2010, the switch 3000, and the storage I/F 1010.

The tape library 2100 constitutes a device for backing up the data stored in the high-end storage device 1000 and the mid-range storage device 1100. The tape library 2100 is connected to the high-end storage device 1000 by means of a storage I/F 2110, the switch 3000, and the storage I/F 1010.

The application server 4000 is a computer device which executes an application program using data located in the high-end storage device 1000 and the mid-range storage device 1100. The application server 4000 is connected to the high-end storage device 1000 by means of a storage I/F 4010, the switch 3000, and the storage I/F 1010.

The management server 5000 is a computer device for managing the high-end storage device 1000, the mid-range storage device 1100 and the application server 4000. The management server 5000 is connected to the high-end storage device 1000 by means of a management I/F 5020 and a management I/F 1020. Moreover, the management server 5000 is connected to the mid-range storage device 1100 by means of the management I/F 5020 and a management I/F 1120. Moreover, the management server 5000 is connected to the application server 4000 by means of the management I/F 5020 and a management I/F 4020. Furthermore, the management server 5000 is connected to the high-end storage device 1000 by means of the switch 3000 and the storage I/F 1010.

Next, the high-end storage device 1000 and the mid-range storage device 1100 shall be described.

FIG. 4 is a diagram of the composition of the high-end storage device 1000 and mid-range storage device 1100.

The high-end storage device 1000 comprises a storage device control section 1040 for controlling various processes in the storage device, and a disk section 1080 for storing data.

The storage device control section 1040 comprises a CPU 1041, a cache 1043, a memory 1045, a disk adapter 1050, a storage I/F 1010, a management I/F 1020, and an external connection I/F 1030. The respective modules constituting the storage device control section 1040 are connected to each other in a mutually connectable fashion.

Furthermore, an I/O control program 1042, a volume movement program 1044, a logical/physical mapping table 1046, an external storage region flag table 1047 and an external logical volume table 1048 are provided in the memory 1045.

The CPU 1041 performs various functions of the high-end storage device 1000, by executing respective programs, using the data stored in the respective tables.

Moreover, the storage device control section 1040 is connected to a parity group 1060 and a parity group 1070 of a disk section 1080 by means of the disk adapter 1050. The parity group 1060 comprises a physical storage region 1061, a physical storage region 1062 and a physical storage region 1063. The parity group 1070 comprises a physical storage region 1071, a physical storage region 1072 and a physical storage region 1073.

The mid-range storage device 1100 comprises a storage device control section 1140 for controlling various processes in the storage device, and a disk section 1170 for storing data.

The storage device control section 1140 comprises a CPU 1141, a cache 1143, a memory 1145, a disk adapter 1150, a storage I/F 1110, and a management I/F 1120. The respective modules constituting the storage device control section 1140 are connected to each other in a mutually connectable fashion.

Furthermore, an I/O control program 1142, a logical/physical mapping table 1146, and a volume movement program 1144 are stored in the memory 1145.

The CPU 1141 performs various functions of the mid-range storage device, by executing respective programs, using the data stored in the memory 1145.

Moreover, the storage device control section 1140 is connected to a parity group 1160 of a disk section 1170 by means of the disk adapter 1150. The parity group 1160 contains a physical storage region 1161, a physical storage region 1162 and a physical storage region 1163.

Next, the various tables held in the memory 1045, and the table held in the memory 1145 will be described.

The logical/physical mapping table 1046 holds information which associates logical volumes of the high-end storage device 1000 used by the application server 4000 as a storage region with physical storage regions in the high-end storage device 1000.

FIG. 5A is a diagram of the composition of a logical/physical mapping table 1046. In the logical/physical mapping table 1046, the logical volume ID 10461 is the identifier for a logical volume provided by the high-end storage device 1000 to the application server 4000. The parity group ID 10462 is the identifier for the parity group in which the logical volume identified by the logical volume ID 10461 is located. The physical storage region ID 10463 is the identifier of the physical storage region in which the logical volume identified by the logical volume ID 10461 is located. The address in physical storage region 10464 is information representing the position within the physical storage region at which the logical volume identified by the logical volume ID 10461 is located.

The external storage region flag table 1047 holds information indicating the respective location of the physical storage region of each logical volume provided by the high-end storage device 1000 to the application server 4000. In the present embodiment, this table stores information indicating whether the storage region is located within the high-end storage device 1000, or whether it is located in another storage device connected via the external connection I/F 1030.

FIG. 5B is a diagram of the composition of the external storage region flag table 1047. As the diagram shows, the logical volume ID 10471 is an identifier for a storage region provided by the high-end storage device 1000 to the application server 4000. The external storage region flag 10472 is information representing whether or not the logical volume identified by the logical volume ID 10471 is located in a physical storage region contained within the high-end storage device 1000. In the present embodiment, if the value of the external storage region flag 10472 corresponding to a logical volume ID 10471 is zero, then this indicates that the logical volume identified by the logical volume ID 10471 is located in a physical storage region within the high-end storage device 1000. Moreover, if the value of the external storage region flag 10472 corresponding to a logical volume ID 10471 is 1, then this indicates that the logical volume identified by the logical volume ID 10471 is located in a physical storage region within a separate storage device connected via the external connection I/F 1030.

The external logical volume table 1048 holds information indicating the storage location of those logical volumes of the logical volumes provided by the high-end storage device 1000 to the application server 4000, that are located in a physical storage region contained in a separate storage device connected via the external connection I/F 1030. In the present embodiment, this table stores information which associates a logical volume in the high-end storage device 1000 with a logical volume in the other storage device where the physical storage region is located.

FIG. 5C is a diagram showing the composition of an external logical volume table 1048. The logical volume ID 10481 is an identifier for a storage region provided by the high-end storage device 1000 to the application server 4000. The storage device ID 10482 is an identifier indicating a storage device connected to via the external connection I/F 1030, in which the physical storage region of the logical volume identified by the logical volume ID 10481 is located. The external logical volume ID 10483 is an identifier for a logical volume in an externally connected storage device, which corresponds to the logical volume identified by the logical volume ID 10481.

The logical/physical mapping table 1146 holds information which associates logical volumes of the mid-range storage device 1100 provided to the high-end storage device 1000 as an externally connected storage region, with physical storage regions inside the mid-range storage device 1100.

FIG. 5D is a diagram of the composition of the logical/physical mapping table 1146. The logical volume ID 11461 is an identifier for a logical volume provided by the mid-range storage device 1100 to the high-end storage device 1000. The parity group ID 11462 is the identifier for the parity group in which the logical volume identified by the logical volume ID 11461 is located. The physical storage region ID 11463 is the identifier of the physical storage region in which the logical volume identified by the logical volume ID 11461 is located. The address in physical storage region 11464 is information representing the position within the physical storage region at which the logical volume identified by the logical volume ID 11461 is located.

The volume movement program 1044 changes the physical storage region to which a logical volume is assigned in accordance with instructions from the management server 5000. In other words, it copies the data at the address assigned to the logical volume, from the physical storage region to which it is initially assigned, to an address in a different allocation destination storage region, and it rewrites the related information in the respective tables 1046, 1047 and 1048.

The volume movement program 1144 rewrites the logical/physical mapping table in accordance with instructions from the high-end storage device 1000.

The I/O control programs 1041, 1142 process acquisition requests for data contained in the high-end storage device 1000 or mid-range storage device 1100, input via the storage I/Fs 1010, 1110, and they obtain the data from the hard disk drive on which it is stored and transmit the data via the storage I/Fs 1010, 1110.

Figure 6:
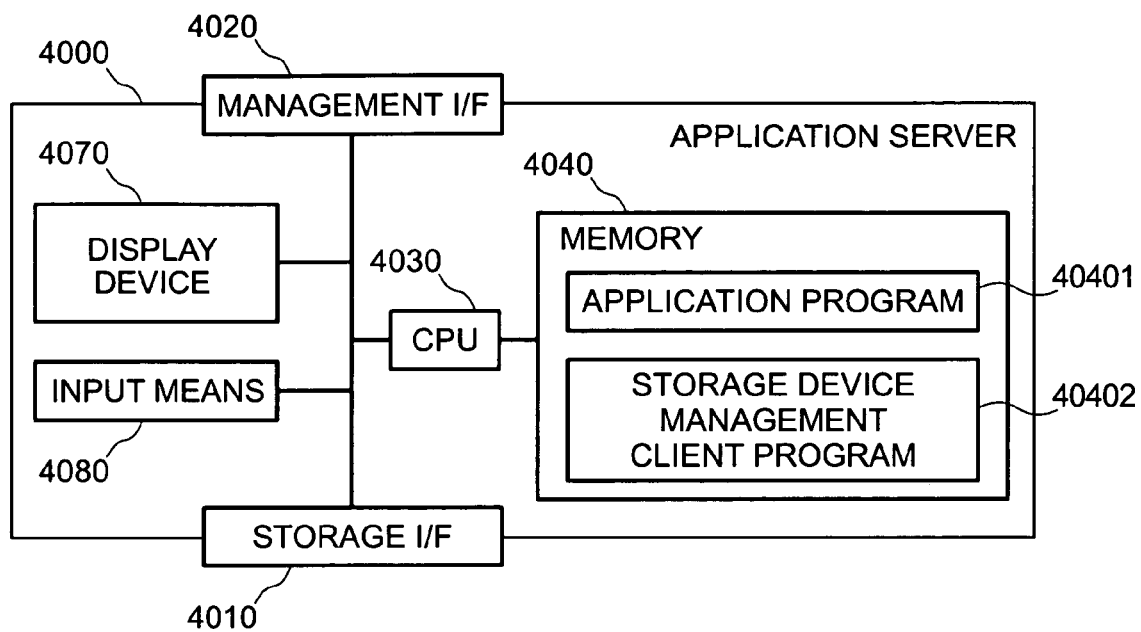
FIG. 6 is a block diagram of an application server according to the first embodiment of the invention.

Next, the application server 4000 shall be described. FIG. 6 is a diagram of the composition of the application server 4000. The application server 4000 comprises a storage I/F 4010, a management I/F 4020, a CPU 4030, a memory 4040, a display device 4070 and input means 4080. The respective modules constituting the application server 4000 are connected to each other in a mutually communicable fashion.

The memory 4040 stores an application program 40401 and a storage device management client program 40402, and the CPU 4030 performs the various functions of the application server 4000 by loading the respective programs from the memory 4040.

The storage device management client program 40402 transmits logical volume allocation requests and logical volume access requests, and the like, received from a client via the input means 4080, to the management server.

(Accessing Storage)

Here, a mode is described wherein the application server 4000 performs access to the high-end storage device 1000 and to the mid-range storage device 1100 via the high-end storage device 1000.

(Accessing the High-End Storage Device)

During execution of the application program 40401, if there is a command to access a storage region of logical volume ID "Volume 1" in the high-end storage device 1000, then the CPU 4030 performs access to the logical volume ID "Volume 1", via the storage I/F 4010, in accordance with the storage device management client program 40402.

The access command to the logical volume ID "Volume 1" of the high-end storage device 1000 is transmitted via the switch 3000 and the storage I/F 1010 to the storage device control section 1040 in the high-end storage device 1000.

Upon receiving the access command for "Volume 1" from the application server 4000, the CPU 1041 carries out processing in accordance with the I/O control program 1042.

Firstly, the CPU 1041 refers to the external storage region flag table 1047 and identifies the location of the logical volume designated as the access destination. In the case of the example shown in FIG. 5B, the CPU 1041 recognizes that the external storage region flag 10472, corresponding to the entry "Volume 1" in the logical volume ID 10471, is "0", and therefore it judges that the logical volume identified by the logical volume ID "Volume 1" is located in a physical storage region contained within the high-end storage device 1000.

Thereupon, the CPU 1041 refers to the logical/physical mapping table 1046 and acquires the parity group ID, physical storage region ID and the physical storage region address for the designated logical volume. In the example shown in FIG. 5A, the CPU 1041 acquires respective values of "1060" for the parity group ID 10462, "1061" for the physical storage region ID 10463, and "0–1023" for the address in physical storage region 10464, corresponding to an logical volume ID 10461 of "Volume 1".

The CPU 1041 then accesses the address range 0–1023 in the physical storage region 1061 of the parity group 1060 via the disk adapter 1050.

Finally, the CPU 1041 sends the value of the access result to the application server 4000 via the storage I/F 1010. The value of the access result thus transmitted reaches the application server 4000 via the switch 3000 and the storage I/F 4010.

When the access result value reaches the application server 4000, the CPU 4030 executes the next step in the application program 40401.

(Access to Externally Connected Storage (Mid-Range Storage Device 1100))

During execution of the application program 40401, if there is a command to access a storage region of logical volume ID "Volume 3" in the high-end storage device 1000, then the CPU 4030 performs access to the logical volume ID "Volume 3", via the storage I/F 4010.

The access command to the logical volume ID "Volume 3" of the high-end storage device 1000 is transmitted via the switch 3000 and the storage I/F 1010 to the storage device control section 1040 in the high-end storage device 1000.

Upon receiving the access command for "Volume 3" from the application server 4000, the CPU 1041 carries out processing in accordance with the I/O control program 1042.

Firstly, the CPU 1041 refers to the external storage region flag table 1047 and identifies the location of the logical volume designated as the access destination. In the case of the example shown in FIG. 5B, the CPU 1041 recognizes that the external storage region flag 10472 corresponding to the entry "Volume 3" in the logical volume ID 10471, is "1", and therefore it judges that the logical volume identified by the logical volume ID "Volume 3" is located in a physical storage region contained in a separate storage device connected via the external connection I/F 1030.

Thereupon, the CPU 1041 refers to the external logical volume table 1048 and acquires information relating to the storage device to which the logical volume in question belongs, and information relating to the logical volume in that storage device. In other words, in the example illustrated in FIG. 5C, the CPU 1041 acquires information values of "1100" for the storage device ID, and "Volume 1" for the external logical volume ID, corresponding to the external logical volume ID 10481, "Volume 3".

The CPU 1041 then performs access to the logical volume ID "Volume 1" in the mid-range storage device 1100, which has a storage device ID of "1100", by means of the external connection I/F 1030.

The access command to the logical volume ID "Volume 1" of the mid-range storage device 1100 is transmitted via the storage I/F 1110 to the storage device control section 1140 of the mid-range storage device 1100.

Upon receiving the access command for "Volume 3" from the high-end storage device 1000, the CPU 1141 carries out processing in accordance with the storage device control program 1149.

The CPU 1141 refers to the logical/physical mapping table 1146, and it acquires the parity group ID, the physical storage region ID, and the physical storage region address for the designated logical volume. In the example shown in FIG. 5D, the CPU 1141 acquires respective values of "1160" for the parity group ID 11462, "1161" for the physical storage region ID 11463, and "0–1023" for the address in physical storage region 11464, corresponding to a logical volume ID 11461 of "Volume 1". The CPU 1141 then accesses the address range 0–1023 in the physical storage region 1161 of the parity group 1160 via the disk adapter 1150.

Finally, the CPU 1141 sends the value of the access result to the high-end storage device 1000 via the storage I/F 1110. The access result value thus transmitted reaches the storage device control section 1040 in the high-end storage device 1000 via the external connection I/F 1030.

When the access result value reaches the storage control section 1040, the CPU 1041 transmits the access result value to the application server 4000 by means of the storage I/F 1010. The value of the access result thus transmitted reaches the application server 4000 via the switch 3000 and the storage I/F 4010.

When the access result value reaches the application server 4000, the CPU 4030 executes the next step in the application program 40401.

A process for accessing the high-end storage device 1000, and the like, from the application server has been described.

Figure 7:
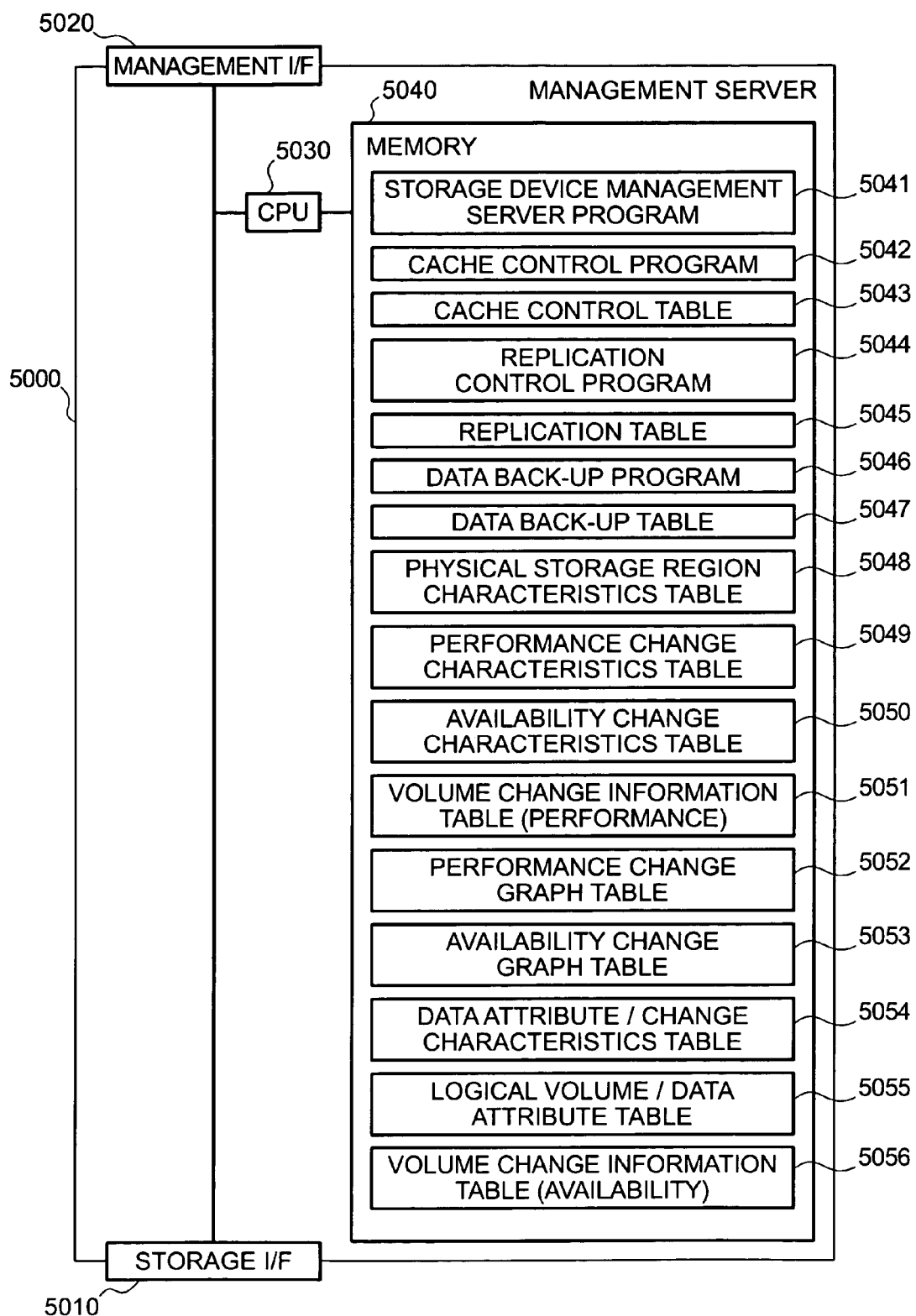
FIG. 7 is a block diagram of a management server according to the first embodiment of the invention.

Next, the management server 5000 shall be described. FIG. 7 is a diagram of the composition of the management server 5000.

The management server 5000 comprises a storage I/F 5010, a management I/F 5020, a CPU 5030 and a memory 5040. The respective modules constituting the management server 5000 are connected to each other in a mutually communicable fashion.

The memory 5040 stores a storage device management server program 5041, a cache control program 5042, a cache control table 5043, a replication control program 5044, a replication table 5045, a data back-up program 5046, a data back-up table 5047, a physical storage region table 5048, a performance change characteristics table 5049, an availability change characteristics table 5050, a volume movement information table (performance) 5051, a performance change graph table 5052, an availability change graph table 5053, a data attribute/change characteristics table 5054, a logical volume/data attribute table 5055, and a volume movement information table (availability) 5056.

In the management server 5000, the CPU 5030 performs the respective functions of the management server 5000 by loading the respective program stored in the memory 5040 and executing the same using data from the respective tables.

In the present embodiment, indicators representing performance and availability are established for each of the respective physical storage regions provided in the high-end storage device 1000 and the mid-range storage device 1100. The settings of these indicators do not relate solely to location, namely whether the relevant physical storage region is located in the high-end storage device 1000 or the mid-range storage device 1100, but rather, they are determined according to whether or not processing for increasing the performance or availability, such as back-up, replication, caching, or the like, has been carried out for the respective physical storage regions.

Here, back-up processing means processing for copying the data stored in the high-end storage device 1000 or the mid-range storage device 1100, to a further device other than the storage devices in question, at prescribed time intervals, and replication processing means processing for reproducing the data stored in the high-end storage device 1000 or the mid-range storage device 1100 to a location within the same storage device.

A method will be described for setting characteristics based on the performance and availability of each physical storage region by using the programs and tables provided in the management server 5000. In accordance with the present embodiment, an example will be described wherein there are three types of indicator settings for the performance and availability, namely, "high", "medium", and "low", but the indicator settings are not limited to these.

(Back-Up Management)

Firstly, back-up processing carried out in the management server 5000 on the basis of the data back-up program 5046 and the data back-up table 5047 will be described. The back-up processing described in connection with the present embodiment involves backing up the data stored in the high-end storage device 1000 or the mid-range storage device 1100 to another device in the same storage system, for example, the disk array type back-up device 2000, or the tape library 2100, at prescribed time intervals. By means of this processing, it is possible to increase the safety of the data stored in the respective storage device, and, hence, recovery processing can be performed readily in the case of an irregularity, such as damaging of the data holding region in the storage device, or the like.

Firstly, the data back-up table 5046 which stores data used in back-up processing will be described. The back-up table 5046 is previously input and saved by an administrator, or the like.

FIG. 8 is a diagram showing the composition of the data back-up table 5047. The storage device ID 50471 is an identifier for the storage device in which the physical storage region to be backed up is located. The physical storage region ID 50472 is an identifier for the physical storage region to be backed up, in the high-end storage device 1000 or the mid-range storage device 1100. The back-up device ID 54073 is an identifier for the back-up device which backs up the data from the physical storage region to be backed up, as identified by the storage device ID 50471 and the physical storage region ID 50472. The back-up device characteristics 50474 is information indicating the performance of the back-up device identified by the back-up device ID 50473.

The back-up device characteristics 50474, which indicates the performance of the back-up destination for the data stored in the respective physical storage regions, is an indicator for determining the availability of the respective physical storage regions.

The data back-up program 5046 is called and executed periodically by the storage device management server program 5041 implemented by the CPU 5030.

When the storage device management server program 5041 calls the data back-up program 5046, firstly, the CPU 5030 acquires information on the storage device ID 50471 and the physical storage region ID 50472, and the back-up device ID 50473, from the data back-up table 5047.

The CPU 5030 executes the data back-up program 5046 and sends a command for the data in the physical storage region identified by the storage device ID 50471 and the physical storage region ID 50472 to be backed up to the back-up device identified by the back-up device ID 50473, (hereinafter, called a back-up command), to the storage device control section 1040 of the high-end storage device 1000, via the storage I/F 5010, the switch 3000 and the storage I/F 1010.

When the back-up command reaches the storage device control section 1040, in accordance with the I/O command program 1042, the CPU 1041 acquires the data in the physical storage region designated in the back-up command via the disk adapter 1050 or the external connection I/F 1030, and backs up this data to the designated back-up device, via the storage I/F 1010 and the switch 3000.

For example, in the case of the example shown in FIG. 8, the data in the physical storage region 1061, the physical storage region 1062, the physical storage region 1071 and the physical storage region 1072 in the high-end storage device 1000, and the data in the physical storage region 1161 and the physical storage region 1162 in the mid-range storage device 1100, is backed up to the disk array type back-up device 2000. Furthermore, in this scenario, the data in the physical storage region 1063, and the physical storage region 1073 of the high-end storage device 1000, and the data in the physical storage region 1163 of the mid-range storage device 1100, is backed up to the tape library 2100.

(Replication Management)

Next, the replication processing carried out by the management server 5000 on the basis of the replication control program 5044 and the replication table 5045 will be described. The replication processing in the present embodiment is processing for generating a replicate copy of the designated physical storage region within the same storage device. In the present embodiment, a replicate is generated for physical storage regions designated in the replication table 5045.

The fact that replication processing is or is not carried out for a particular physical storage region is used as an indicator when determining the availability of that physical storage region, as will be described hereinafter. For example, a physical storage device for which replication processing is carried out will be judged to have a "high" availability.

Firstly, the replication table 5045 which stores data used in replication processing will be described. The back-up table 5045 is previously input and saved by an administrator, or the like.

FIG. 9 is a diagram showing the composition of the replication table 5045. The storage device ID 50451 is an identifier for the storage device in which the physical storage region to be replicated is located. The physical storage region ID 50452 is an identifier for the physical storage region in the storage device, of which a replicate copy is to be created.

The replication control program 5044 is called and executed by the storage device management server program 5041 implemented by the CPU 5030 at start-up.

Firstly, the CPU 5030 acquires information relating to the storage device ID 50451 and the physical storage region ID 50452 from the replication table 5045.

The CPU 5030 then executes the replication control program 5044, and it sends a command for a replicate copy of the physical storage region identified by the storage device ID 50451 and the physical storage region ID 50452 to be created within the same storage device, via the storage I/F 5010, the switch 3000, and the storage I/F 1010, to the storage device control section 1040 of the high-end storage device 1000.

When the replicate creation command reaches the storage device control section 1040, in accordance with the I/O control program 1042, the CPU 1041 of the high-end storage device 1000 determines whether or not the physical storage region designated by the physical storage region ID 50452, of which a replicate copy is to be created, is located within the high-end storage device 1000. If the physical storage region in question is located within the high-end storage device 1000, then the CPU 1041 accesses the designated physical storage region by means of the disk adapter 1050, and creates a replicate copy of that physical storage region.

If the physical storage region in question is located in the mid-range storage device 1100, then the CPU 1041 sends a replicate creation command to the storage device control section 1140 of the mid-range storage device 1100 via the external connection I/F 1030 and the storage I/F 1110. When the replication creation command reaches the storage device control section 1140, in accordance with the I/O control program 1142, the CPU 1141 of the mid-range storage device 1100 accesses the designated physical storage region, via the disk adapter 1150, and creates a replicate of that physical storage region.

In the case of the example shown in FIG. 9, the physical storage region 1061 and the physical storage region 1071 in the high-end storage device 1000, and the physical storage region 1161 in the mid-range storage device 1100, respectively, have replicate copies within the same storage device.

<Cache Management>

Next, the cache processing, which is carried out by the management server 5000 on the basis of the cache control program 5042 and the cache control table 5043, will be described. The cache processing in the present embodiment is used for placing data stored in the designated physical storage region on the cache as resident data. In the present embodiment, the data in the physical storage regions designated by the cache control table 5043 is placed on the cache as resident data.

The fact that cache processing is or is not carried out for a particular physical storage region is used as an indicator for determining the performance of the physical storage region in question, as will be described hereinafter. In other words, if cache processing is carried out, then it is possible to improve the access performance to the physical storage region in question, and, hence, that physical storage region is judged to have a "high" performance.

Firstly, the cache control 5043 which stores data used in cache processing will be described. The cache control table 5043 is previously input and saved by an administrator, or the like.

FIG. 10 is a diagram showing the composition of the cache control table 5043. The storage device ID 50431 is an identifier for the storage device in which the physical storage region, whose data is to be placed as resident data on the cache, is located. The physical storage region ID 50432 is an identifier for the physical storage region in the storage device, whose data is to be placed as resident data on the cache.

The cache control program 5042 is called and executed by the storage device management server program 5041 implemented by the CPU 5030 at start-up.

Firstly, the CPU 5030 acquires information about the storage device ID 50431 and the physical storage region ID 50432 from the cache control table 5043.

The CPU 5030 then executes the cache control program 5042 and sends a command for the physical storage region identified by the storage device ID 50431 and the physical storage region ID 50432 to be placed as resident data on the cache via the storage I/F 5010, the switch 3000, and the storage I/F 1010, to the storage device control section 1040 of the high-end storage device 1000.

When the caching command reaches the storage device control section 1040, in accordance with the I/O control program 1042, the CPU 1041 of the high-end storage device 1000 determines whether or not the physical storage region designated by the physical storage region ID 50432, which is the object of the caching command, is located within the high-end storage device 1000. If the physical storage region in question is located within the high-end storage device 1000, then the CPU 1041 reads out the data of the physical storage region via the disk adapter 1050 and writes the data to the cache 1043.

If the physical storage region in question is located in the mid-range storage device 1100, then the CPU 1041 sends a caching command to the storage device control section 1140 of the mid-range storage device 1100 via the external connection I/F 1030 and the storage I/F 1110. When the caching command reaches the storage device control section 1140, in accordance with the I/O control program 1142, the CPU 1141 of the mid-range storage device 1100 accesses the designated physical storage region via the disk adapter 1150, reads out the data from that physical storage region, and writes the data to the cache 1143.

In the case of the example shown in FIG. 10, the physical storage region 1061, the physical storage region 1062 and the physical storage region 1063 in the high-end storage device are resident on the cache.

(Setting the Physical Storage Region Characteristics)

As described above, performance and availability characteristics are set for each of the physical storage regions provided in the high-end storage device 1000 and the mid-range storage device 1100, according to whether or not the aforementioned back-up processing, replication processing or caching processing are carried out with respect to that physical storage region. The characteristics of each physical storage region are stored and held in the physical storage region characteristics table 5048 by the storage device management server program 5041. Below, a procedure for storing the characteristics of each physical storage region in the physical storage region characteristics table 5048 by means of the storage device management server program 5041 will be described.

The CPU 5030 judges the characteristics of each physical storage region in accordance with the processing carried out with respect to the same, and it creates a physical storage region characteristics table 5048 accordingly by executing the aforementioned cache control program 5042, replication control program 5044 and data back-up program 5046 in accordance with the storage device management server program 5041, and then referring to the data back-up table 5047, the replication table 5045 and the cache control table 5043 generated thereby.

Here, the composition of the physical storage region characteristics table 5048 will be described. FIG. 11 is a diagram showing the composition of the physical storage region characteristics table 5048. As shown in this diagram, the physical storage region characteristics table 5048 comprises a storage device ID 50481, a physical storage region ID 50482, performance characteristics 50483, and availability characteristics 50484.

In accordance with the storage device management server program 5041, the CPU 5030 acquires the storage device IDs 50471, physical storage region IDs 50472, and back-up device characteristics 50474 from the data back-up table 5047. It then writes the acquired storage device IDs 50471 to the storage device IDs 50481 in the physical storage region characteristics table 5048 and writes the physical storage region IDs 50472 to the physical storage region IDs 50482, respectively.

Thereupon, the CPU 5030 writes "medium" or "low" as an indicator representing availability to the availability characteristics 50484 column in accordance with the value stored in the back-up device characteristics 50474 column. In other words, if the value stored in the back-up device characteristics 50474 is "high-speed", then "medium" is written to the availability characteristics 50484; and, if the value of the back-up device characteristics 50474 is "low-speed", then "low" is written to the availability characteristics 50484.

Next, the CPU 5030 acquires the storage device IDs 50451 and the physical storage region IDs 50452 from the replication table 5045. The CPU 5030 then refers to the storage device IDs 50481 and the physical storage region IDs 50482 already stored in the physical storage region characteristics table 5048, and it searches for combinations which match the storage device IDs 50451 and the physical storage region IDs 50452 thus acquired. If a matching combination is found, then the CPU 5030 writes "high" to the availability characteristics 50484 corresponding to that particular combination.

Next, the CPU 5030 refers to the storage device IDs 50481 in the physical storage region characteristics table 5048 and writes the performance characteristics 50483 in accordance with the performance of the actual storage device. In the present embodiment, if the ID of the high-end storage device 1000, namely, "1000", is written, then "medium" is written as the corresponding value for performance characteristics 50483; and, if the ID of the mid-range storage device 1100, namely, "1100", is written, then "low" is written as the corresponding value for performance characteristics 50483.

The CPU 5030 then acquires the storage device IDs 50431 and the physical storage region IDs 50432 from the cache control table 5043. Next, the CPU 5030 refers to the storage device IDs 50481 and the physical storage region IDs 50482 in the physical storage region characteristics table 5048, and it searches for any combinations which match the combinations of storage device IDs 50431 and physical storage region IDs 50432. If a matching combination is found, then the CPU 5030 writes "high" to the performance characteristics 50483 corresponding to that particular combination.

By means of the foregoing procedure, the CPU 5030 generates a physical storage region characteristics table 5048 in accordance with storage device management server program 5041.

(Performance Characteristics and Availability Characteristics)

Furthermore, in the present embodiment, information indicating respective temporal changes in the performance and the availability, in accordance with the types of data stored in the storage device, is prepared in advance. This previously prepared information indicating temporal change is described below.

In the present embodiment, the management server 5000 comprises a performance change graph table 5052 and an availability change graph table 5050 which hold, in graph form, information indicating the general change, over time, in the performance and availability required of the storage region to which a particular logical volume is assigned, in accordance with the type of data stored in that logical volume, as well as a volume movement information table (performance) 5051 and a volume movement information table (availability) 5056, which store information identifying the concrete characteristics of a physical storage region that is to be moved in accordance with temporal change.

The actual performance characteristics of the movement destination are determined and held in the volume movement information table (performance) 5051 and the volume movement information table (availability) 5056, in accordance with the change indicated in the performance change graph table 5052 and the volume movement information table (availability) 5056. In these tables, the particular date and time giving cause to movement of a logical volume in accordance with a temporal change in the performance or availability (hereinafter, called "volume movement") is referred to as the established date and time.

Figure 13:
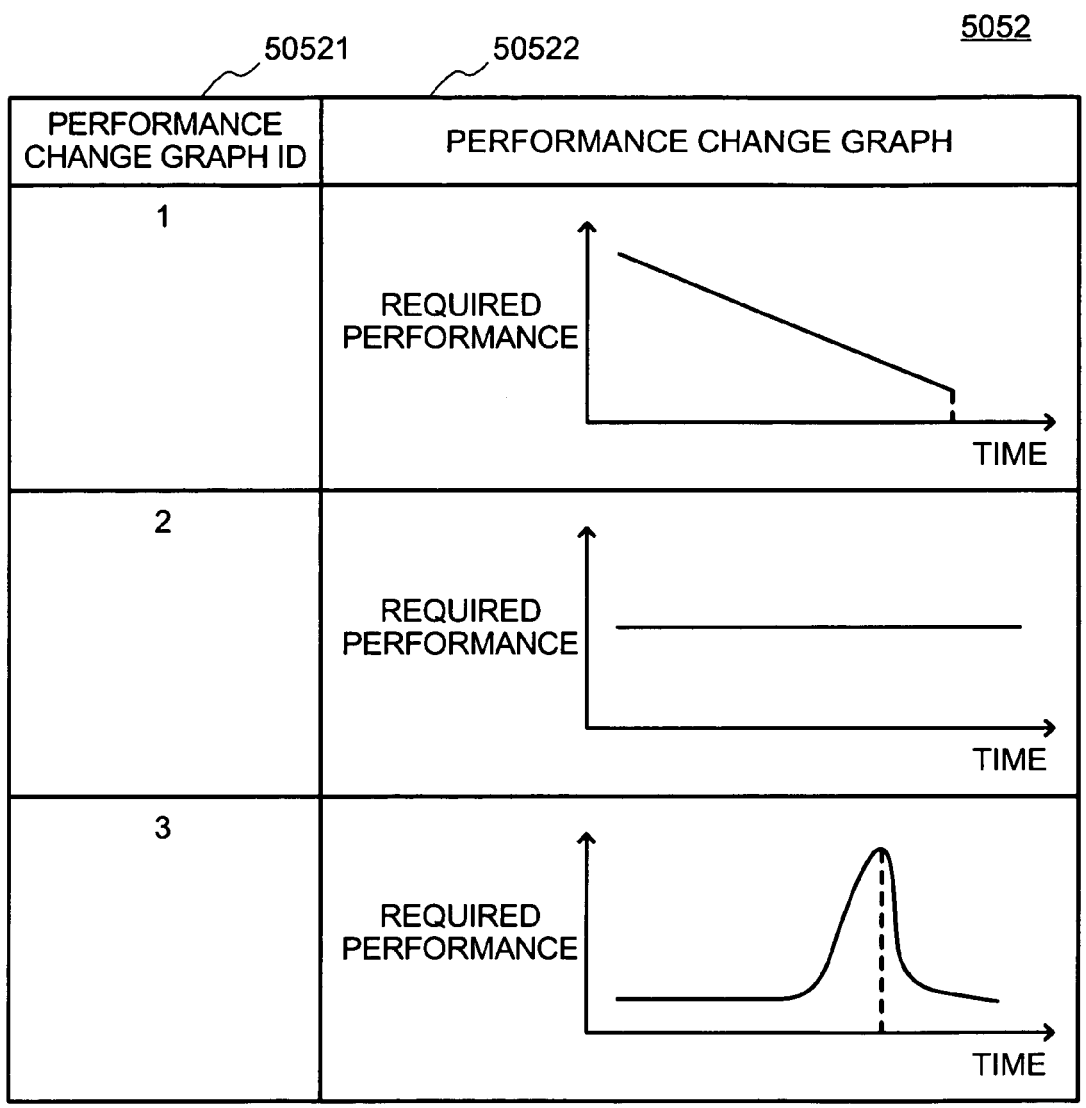
FIG. 13 is a diagram showing the composition of a performance change graph table according to the first embodiment of the invention.

FIG. 13 is a diagram showing the composition of the performance change graph table 5052. As shown in this diagram, the performance change graph table 5052 comprises performance change graph IDs 50521 and performance change graphs 50522.

The performance change graph ID 50521 is an identifier for a graph representing a performance change. The performance change graph 50522 is a graph representing the change with the passage of time in the performance required of the physical storage region, in which the data is stored, for each type of data.

Figure 15:
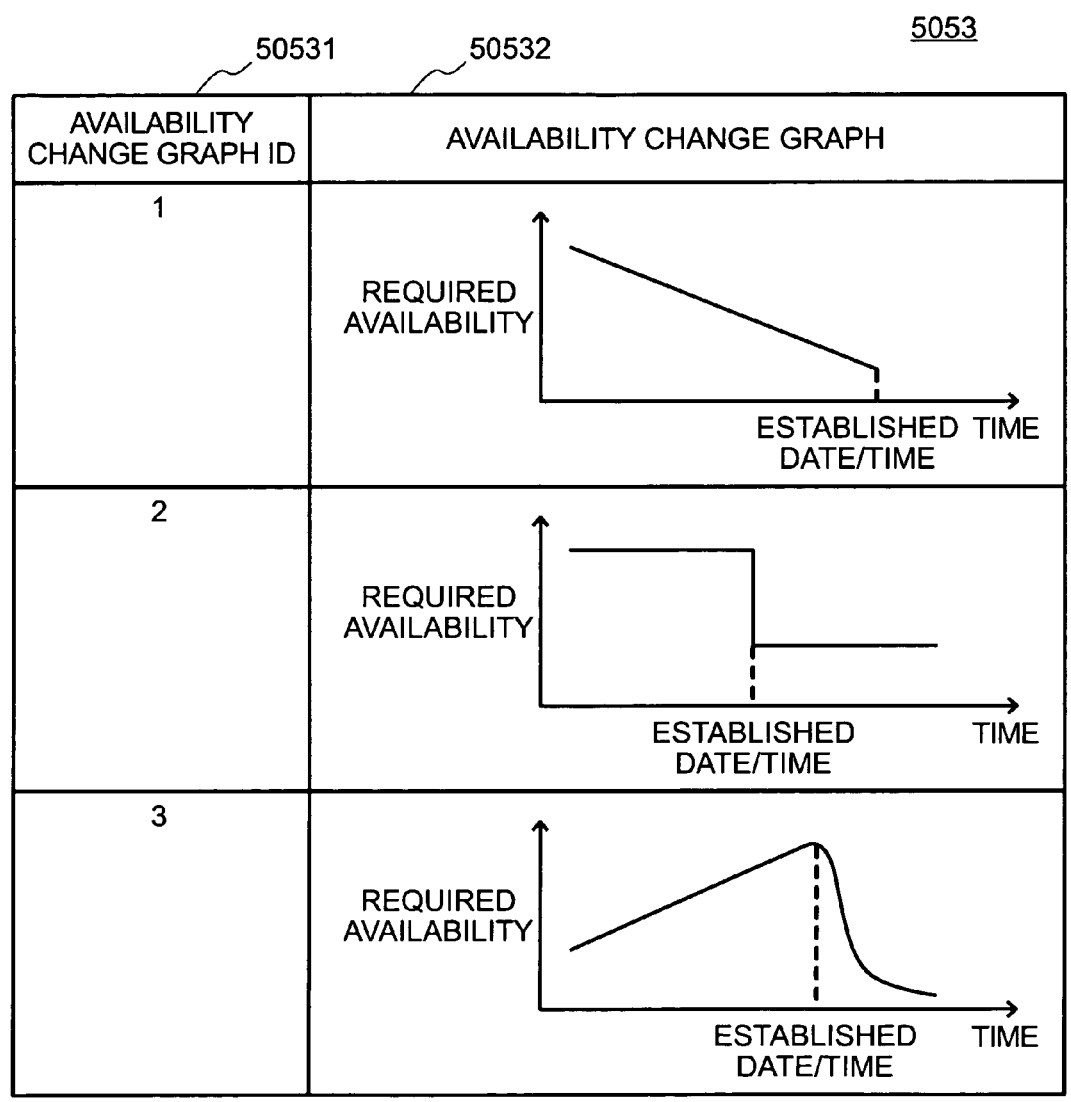
FIG. 15 is a diagram showing the composition of an availability change graph table according to the first embodiment of the invention.

FIG. 15 is a diagram showing the composition of the availability change graph table 5053. As shown in this diagram, the availability change graph table 5053 comprises availability change graph IDs 50531 and availability change graphs 50532.

The availability change graph ID 50531 is an identifier for a graph representing an availability change. The availability change graph 50532 is a graph representing the change with the passage of time in the availability required of the physical storage region, in which the data is stored, for each type of data.

FIG. 12B is a diagram showing the composition of the volume movement information table (performance) 5051. As shown in this diagram, the volume movement information table 5051 comprises volume movement information (performance) ID 50511, movement numbers 50512, movement date and time information 50513, and movement destination performance characteristics 50514.

The volume movement information (performance) ID 50511 corresponds to the respective change characteristics indicated in a performance change graph 5052, in other words, it corresponds to a performance change graph ID 50521.

The movement destination performance characteristics 50514 represent the performance characteristics of the physical storage region forming the volume movement destination, in the volume movement at the timing indicated by the movement date and time 50513. This is found by determining and storing the level of performance characteristics of the physical storage regions where the respective data are to be stored, in the event that the prescribed threshold value is exceeded, on the basis of a change in the performance change graph 50522.

The movement date/time 50513 indicates the timing at which volume movement is carried out. Similar to the movement destination performance characteristics 50514, the date and time at which the aforementioned movement destination performance characteristics 50514 change on the basis of the change in the performance change graph 50522 is stored as the timing at which movement is carried out.

The movement number 50512 is a number that represents a procedure for volume movement.

FIG. 14(B) is a diagram of the composition of the volume movement information table (availability) 5056. As shown in this diagram, the volume movement information table (availability) 5056 comprises volume movement information (availability) IDs 50561, movement numbers 50562, movement date and time information 50563, and movement destination availability characteristics 50564.

The volume movement information (availability) ID 50561 corresponds to the respective change characteristics indicated in an availability change graph 5053; in other words, it corresponds to an availability change graph ID 50531.

The movement destination availability characteristics 50564 represent the availability characteristics of the physical storage region forming the volume movement destination in the volume movement at the timing indicated by the movement date and time 50563. This is found by determining and storing the level of performance characteristics of the physical storage regions where the respective data are to be stored, in the event that the prescribed threshold value is exceeded, on the basis of the change in the availability change graph 50522.

The movement date/time 50563 indicates the timing at which volume movement is carried out. Similarly to the movement destination availability characteristics 50564, the date and time at which the aforementioned movement destination availability characteristics 50564 change on the basis of the change in the availability change graph 50532 is stored as the timing at which movement is carried out.

The movement number 50562 is a number that represents a procedure for volume movement.

The movement destination availability characteristics 50564 represent the availability characteristics of the physical storage region forming the volume movement destination in the volume movement at the timing indicated by the movement date and time 50563.

For example, firstly, a logical volume having data attributes wherein the volume movement information (availability) ID 50561 is "1" will be assigned to a physical storage region having "high" performance characteristics, by means of a procedure indicated by a movement number 50562 of "1". Thereupon, by means of a procedure indicated by a movement number 50562 of "2", it will be reassigned to a physical storage region having "medium" performance characteristics, when one third of the time period from the time of its first assignment until the established date and time has elapsed. Thereupon, by means of a procedure indicated by a movement number 50562 of "3", it will be reassigned to a physical storage region having "low" performance characteristics, when two thirds of the time period from the time of its first assignment until the established date and time has elapsed.

A logical volume having data attributes wherein the volume movement information (availability) ID 50561 is "1", for example, will be assigned firstly to a physical storage region having "high" availability characteristics, by means of a procedure indicated by a movement number 50562 of "1". Thereupon, by means of a procedure indicated by a movement number 50562 of "2", it will be assigned to a physical storage region having "medium" availability characteristics, when one third of the time period from the time of its first assignment until the established date and time has elapsed. Thereupon, by means of a procedure indicated by a movement number 50562 of "3", it will be assigned to a physical storage region having "low" availability characteristics, when two thirds of the time period from the time of its first assignment until the established date and time has elapsed.

In the present embodiment, when the aforementioned established date and time is determined, then information specifying the established date and time is held in the performance change characteristics table 5049, the availability change characteristics table 5050 and the data attribute/change characteristics table 5054, on the basis of the aforementioned previously stored information indicating the temporal change in the performance and availability required of the storage destination corresponding to respective data types. Below, these various tables will be described.

FIG. 12A is a diagram showing the composition of a performance change characteristics table 5049. As shown in the diagram, the performance change characteristics table 5049 comprises performance change characteristics IDs 50491, established date/time names 50492, established date/time information 50493, volume movement information IDs 50494, and performance change graph IDs 50495.

The performance change characteristics ID 50491 is an indicator for identifying the temporal change in the access performance required of the storage destination by the data, and it is assigned universally to each data element stored in the table.

The established date/time name 50492 is the name of the date/time giving rise to a volume movement. For example, if the data is monitoring data, then the name "monitoring date" is assigned; and, if the data is a mail log, then the "storage conditions change date" indicating the day on which storage ends is assigned as a name.

The established date/time 50493 is the specific date and time giving rise to a volume movement, as identified by the established date/time name 50492. In the case of monitoring data, this will be the actual monitoring date, and in the case of a mail log, or the like, it will be the actual date on which the storage conditions change.

The volume movement information ID 50494 is an identifier for identifying the volume movement information for each data item stored in the performance change characteristics table 5049, and it contains a volume movement information (performance) ID 50511 relating to the aforementioned volume movement information (performance) 5051. For example, in the case of monitoring data, it contains the value "3" and in the case of a mail log, it contains the value "1".

The performance change graph ID 50495 is an identifier for identifying a graph showing the temporal change in performance for each data element stored in the performance change characteristics table 5049, and it contains a performance change graph ID 50521 relating to the corresponding performance change graph table 5052.

FIG. 14A is a diagram showing the composition of an availability change characteristics table 5050. As shown in the diagram, this table comprises availability change characteristics IDs 50501, established date/time names 50502, established date/time information 50503, volume movement information ID 50504 and availability change graph IDs 50505.

The availability change characteristics ID 50501 is an indicator for identifying the temporal change in the availability required by the data, and it is assigned universally to each data element stored in the table.

The established date/time name 50502 is the name of the date/time giving rise to a volume movement. For example, if the data is monitoring data, then the name "monitoring date" is assigned and, if the data is a mail log, then the name "storage conditions change date" is assigned.

The established date/time 50503 is the specific date and time giving rise to a volume movement, as identified by the established date/time name 50502. In the case of monitoring data, this will be the actual monitoring date; and, in the case of a mail log, or the like, it will be the actual date on which the storage conditions change.

The volume movement information ID 50504 is an identifier for identifying the volume movement information for each data item stored in the availability change characteristics table 5050, and it contains volume movement information (availability) IDs 50561 for the aforementioned volume movement information (availability) 5056. For example, in the case of monitoring data, it contains the value "3", and in the case of a mail log, it contains the value "1".

The availability change graph ID 50505 is an identifier for identifying a graph showing the temporal change in availability for each data element stored in the availability change characteristics table 5050, and it contains an availability change graph ID 50531 relating to the corresponding availability change graph table 5053.

Here, in the present embodiment, as described above, previously prepared information identifying a temporal change in performance and availability is held in the data attribute/change characteristics table 5054 for each data attribute.

FIG. 16 is a diagram showing the composition of the data attribute/change characteristics table 5054. Volume movement for achieving optimal location of the logical volumes is carried out on the basis of this table, as will be described hereinafter.

As shown in this diagram, the data attribute/change characteristics table 5054 comprises data attribute names 50541, performance change characteristics IDs 50542 and availability change characteristics IDs 50543.

The data attribute name 50541 is the name of a data attribute indicating the type of data stored in a logical volume in the storage device. For example, in the case of monitoring data with a monitoring date of $30^{th}$ June, the name is "monitoring data with established date & time 6/30"; in the case of monitoring data with a monitoring date of $30^{th}$ September, the name is "monitoring data with established date & time 9/30"; and, in the case of a mail log with a storage end date, in other words, a storage conditions change date of $15^{th}$ July, the name is "mail log with established date & time 7/15", and so on.

The performance change characteristics ID 50542 is information identifying the performance change characteristics of data having the data attribute identified by the data attribute name 50541. More specifically, it is the value of a performance change characteristics ID 50491 in the performance change characteristics table 5049.

The availability change characteristics ID 50542 is information identifying the availability change characteristics of data having the data attribute identified by the data attribute name 50541. More specifically, it is the value of an availability change characteristics ID 50501 in the availability change characteristics table 5050.

(Setting the Data Attribute when Assigning Logical Volumes)

Furthermore, in the present embodiment, a logical volume/data attribute table 5055 is stored which contains information indicating the attributes of the data stored in each one of the logical volumes.

Figures 18, 19:
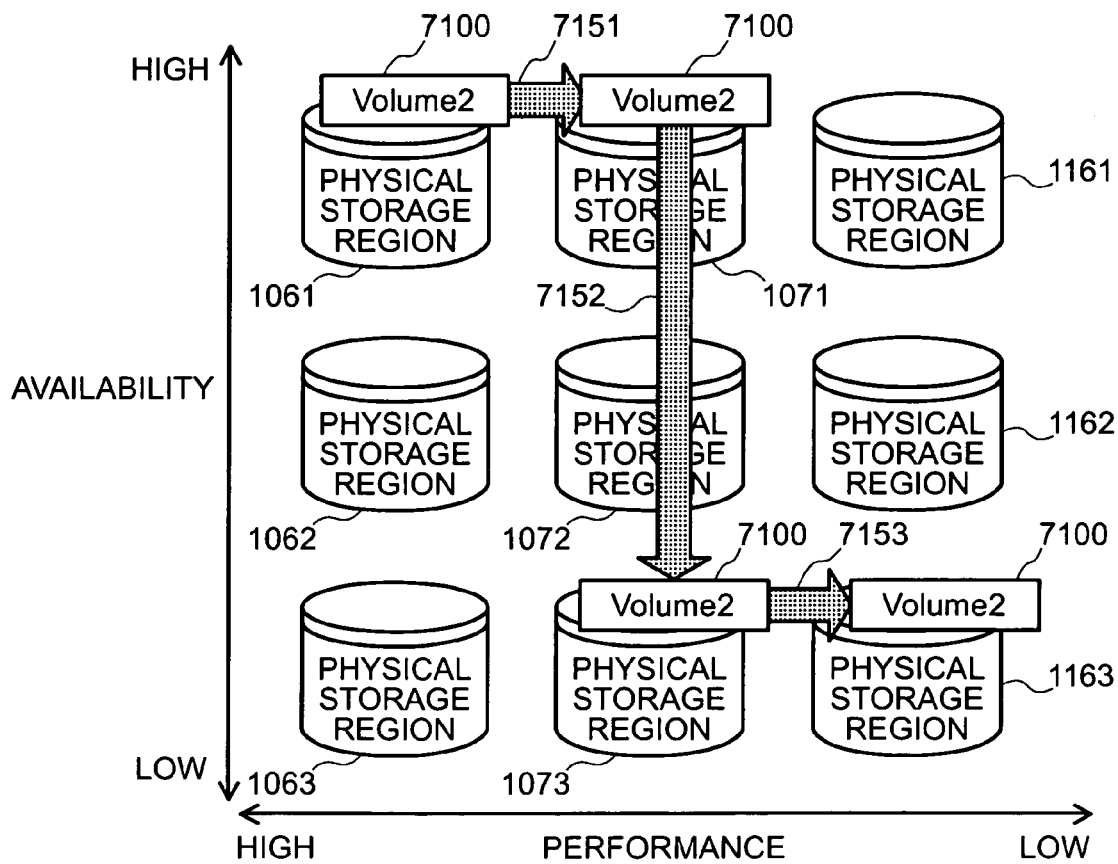
FIG. 18 is a diagram showing the composition of logical volume/data attribute-table according to the first embodiment of the invention.
FIG. 19 is a diagram illustrating the movement of logical volumes according to the first embodiment of the invention.

FIG. 18 is a diagram of the composition of the logical volume/data attribute table 5055. The logical volume/data attribute table 5055 comprises logical volume IDs 50551 and data attributes 50552. The logical volume ID 50551 is an identifier for identifying a logical volume in the high-end storage device 1000. The data attribute 50552 is a data attribute which corresponds to the logical volume identified by the logical volume ID 50551.

Below, the method used in the management server 5000 for assigning logical volumes as storage regions to be used by the application server 4000 and generating a logical volume/data attribute table 5055 will be described.

In the application server 4000, when an logical volume of the high-end storage device 1000 is to be assigned as a storage region for use by the application program 40401, the application program 40401 calls the storage device management client program 40402.

The CPU 4030 loads and executes the storage device control client program 40402, and it requests the management server 5000 to assign the logical volume via the management I/F 4020.

When the management server 5000 receives the logical volume assignment request from the application server 4000, via the management I/F 5020, the CPU 5030 calls the storage device management server program 5041.

The CPU 5030 sends a request to acquire a logical volume list (list acquisition request) to the high-end storage device 1000 via the management I/F 5020. In accordance with the I/O control program 1042, the CPU 1041 of the high-end storage device 1000, having received the list acquisition request via the management I/F 1010, refers to the logical/physical mapping table 1046, acquires the logical volume IDs 10461 therein, and sends same to the management server 5000 via the management I/F 1020.

On the other hand, the CPU 5030 of the management server calls the storage device management server program 5041 and acquires all of the data attribute names 50541, and the respective performance change characteristics IDs 50542 and availability change characteristics IDs 50543 that it is holding itself, from the data attribute/change characteristics table 5054. The CPU 5030 accesses the performance change characteristics table 5049 and the availability change characteristics table 5050, and it extracts data identified respectively by the performance change characteristics IDs 50542 and the availability change characteristics IDs 50543. Thereupon, the CPU 5030 accesses the performance change graph table 5052 and the availability change graph table 5053, and it acquires the performance change graphs 50522 and the availability change graphs 50532 corresponding to the performance change characteristics graph IDs 50495 and the availability change graph IDs 50505 of the extracted data.

Furthermore, the CPU 5030 also acquires the logical volume/data attribute table 5055 in order to obtain information on the IDs of logical volumes that have been assigned already.

The CPU 5030 sends the logical volume IDs 10461 forming the list of logical volumes acquired from the high-end storage device 1000, the data attribute names 50541 acquired in accordance with the storage device management server program 5041, and the performance change graphs 50522 and availability change graphs 50533 corresponding respectively to same, to the application server 4000, by means of the management I/F 5020.

The CPU 4030 of the application server 4000 constructs a logical volume allocation screen 9000, using the logical volume ID received via the management I/F 4020, the data attribute name 50541, performance change graph 50522, availability change graph 50532, and the logical volume/data attribute table 5055, and it displays this screen on a display device 4070.

FIG. 17 shows one example of such a display. As shown in the diagram, the logical volume allocation screen 9000 comprises a logical volume ID selection box 9100 for selecting a logical volume storing data, a data attribute name box 9200 for specifying the attributes of the stored data, and an OK button for receiving acknowledgement from the user.

The CPU 4030 of the application extracts currently unassigned logical volumes, using the logical volume IDs 10461 and the information in the logical volume/data attribute table 5055, and displays the same in the logical volume ID selection box 9100. The user is able to select a desired logical volume from the logical volume IDs being displayed.

Furthermore, the CPU 4030 of the application server causes all of the received data attribute names 50541 to be displayed in the data attribute name box 9200 in such a manner that the user can select from same. The user is able to select the data attribute that is to be stored in the storage device from the data attribute names displayed in the data attribute name box 9200.

Furthermore, the CPU 4030 of the application server also causes a performance change graph 50522 indicating the relevant performance change characteristics, and an availability change graph 50532 indicating the relevant availability change characteristics, to be displayed, in coordination with the data attribute displayed as the selection in the data attribute name box 9200. The user is able to refer to these graphs when selecting the data attribute.

Furthermore, upon receiving the acknowledgement of the user via the OK button 9700, the CPU 4030 of the application server sends the logical volume ID 10461 and data attribute 50541 selected by the user in the logical volume ID selection box 9100 and the data attribute name box 9200, respectively, to the management server 5000 via the management I/F 4020.

Upon receiving the logical volume ID 10461 and the data attribute 50541 via the management I/F 5020, the management server 5000 calls the storage device management server program 5041 and stores the received logical volume ID 10461 and data attribute 50541 as a new entry in the logical volume/data attribute table 5055.

In the foregoing, a case was described wherein a performance change characteristics table 5049 and availability change characteristics table 5050 containing established date and time information are prepared in advance, but the invention is not limited to this. For instance, the volume movement information table (performance) 5051, the volume movement information table (availability) 5056, the performance change graph table 5052 and the availability change graph table 5054 only are assigned with a data attribute name and held in the management server 5000, and they are displayed to the user on the display device 4070 of the application server 4000 without established dates and times being specified. In addition to accepting selection of a prescribed data attribute from the data attribute names, as instructed by the user by means of the display device 4070, it is also possible to adopt a composition wherein an instruction of the established date and time and the specified logical volume is also accepted, and a performance change characteristics table 5049, an availability change characteristics table 5050 and a logical volume/data attribute table 5055 are generated and saved by the management server 5000 in accordance with the information thus received.

(Moving Volumes)

Below, a description will be given of the movement of a logical volume as performed in the present embodiment over the passage of time, on the basis of the settings stated above.

Below, the movement of a logical volume having a logical volume ID of "Volume 1" as illustrated in FIG. 18, will be described in detail with reference to FIG. 2, FIG. 5, FIG. 11, FIG. 12A, FIG. 12B, FIG. 14A, FIG. 14B and FIG. 16. The logical volume that is moved in not limited to this one. It is also possible for a plurality of logical volumes to be moved.

In the management server 5000, the CPU 5030 executing the storage device management server program 5041 monitors the movement date/time 50513 in the volume movement information table 5051 and the movement date/time 50563 in the volume movement information table 5056.

(Movement of Logical Volume "Volume 1")

At prescribed time intervals, the CPU 5030 refers to the logical volume/data attribute table 5055 with respect to the logical volume having an logical volume ID 50551 of "Volume 1", and acquires the data attribute "monitoring data with established date/time 6/30", from the data attribute 50552 for same.

Thereupon, the CPU 5030 refers to the data attribute/change characteristics table 5054 with respect to the data attribute "monitoring data with established date/time 6/30", and acquires performance change characteristics ID value of "3" from the performance change characteristics IDs 50542, and the availability change characteristics ID value of "3" from the availability change characteristics IDs 50543.

The CPU 5030 then refers to the performance change characteristics table 5049 on the basis of the performance change characteristics ID "3", and acquires a volume movement information ID value of "3" from the volume movement information IDs 50494. The CPU 5030 then refers to the availability change characteristics table 5050 on the basis of the availability change characteristics ID "3", and acquires a volume movement information ID value of "3" from the volume movement information IDs 50504.

The CPU 5030 refers to the volume movement information table (performance) 5051 and monitors the movement date/time 50513 corresponding to volume movement information (performance) ID "3".

The CPU 5030 also refers to the volume movement information table (availability) 5056 and monitors the movement date/time 50563 corresponding to volume movement information (availability) ID "3".

(Initial Location of Logical Volume "Volume 1")

Firstly, the CPU 5030 reads in that, immediately after assignment of the logical volume "Volume 1", the movement date/time 50513 corresponding to the combination of a volume movement information (performance) ID 50511 of "3" and a movement number 50512 of "1" is "upon creation", and it acquires the value "low" of the movement destination performance characteristics 50514 corresponding to the same.

Simultaneously with this, it reads in that the movement date/time 50563 corresponding to the combination of a volume movement information (availability) ID 50561 of "3" and a movement number 50562 of "1" is "upon creation", and it acquires the value "low" of the movement destination availability characteristics 50564 corresponding to the same.

Thereupon, the CPU 5030 refers to the physical storage region characteristics table 5048 in accordance with the storage device management server program 5041, and it acquires a value of "1100" for the storage device ID 50481 and a value of "1163" for the physical storage region ID 50482 corresponding to the combination of a "low" entry in the performance characteristics 50483 and a "low" entry in the availability characteristics 50484. Here, if there are plurality of storage devices IDs 50481 which correspond to a combination of "low" performance characteristics 50483, and "low" availability characteristics 50484, then IDs for all of these are acquired. This applies similarly to all of the movement steps described below.

The CPU 5030 sends a request for the logical volume having a logical volume ID "Volume 1" to be moved to the physical storage region corresponding to the storage device ID "1100" and the physical storage region ID "1163", to the high-end storage device 1000, via the management I/F 5020 and the management I/F 1020.

When the storage device control section 1040 of the high-end storage device 1000 receives the movement request for the logical volume, the CPU 1041 calls the volume movement program 1044.

In accordance with the volume movement program 1044, the CPU 1041 refers to the external storage region flag table 1047 and the logical/physical mapping table 1046 in the memory 1045, and it acquires information indicating that the logical volume having an logical volume ID "Volume 1" is situated in the physical storage region having a physical storage region ID "1061", and that the address within the physical storage region is "0–1023".

The CPU 1041 compares the physical storage region ID "1163" to which the logical volume is to be moved according to the request, with the ID "1061" of the physical storage region to which "Volume 1" is currently assigned, and since the two IDs are different, it judges that movement is necessary. At this time, if one of the destination physical storage region IDs coincides with the ID of the physical storage region to which the logical volume is currently assigned, then the logical volume is not moved. This applies similarly to all of the movement steps described below.

The CPU 1041 recognizes that the storage device ID contained in the request is "1100", and it sends a request for the data in the address range "0–1023" of the physical storage region 1061 to be copied to the physical storage region 1163 in the mid-range storage device 1100 via the external connection I/F 1030 and the storage I/F 1110.

When the storage device control section 1140 of the mid-range storage device 1100 receives a data copy request, the CPU 1141 writes the received data to the address "1024–2047" of the physical storage region 1163, in accordance with the volume movement program 1144.

Thereupon, the CPU 1141 adds information to the logical/physical mapping table 1146, indicating a logical volume ID 11461 of "Volume 3", a parity group ID 10462 of "1160", a physical storage region ID of "1163" and an address in physical storage region of "1024–2047".

The volume movement means 1044 sets a value of "1" for the external storage region flag 10472 corresponding to a logical volume ID 10471 of "Volume 1" in the external storage region flag table 1047. The volume movement means 1044 also adds information to the external logical volume table 1048 indicating an logical volume ID 10481 of "Volume 1", a storage device ID 10482 of "1100", and an external logical volume ID 10483 of "Volume 3".

Furthermore, the volume movement means 1044 deletes information relating to the logical volume ID 10461 "Volume 1" from the logical/physical mapping table 1046.

(First Movement of Logical Volume "Volume 1")

Next, the movement step 7051 in the logical volume movement illustrated in FIG. 2 will be described in detail.

With respect to the logical volume having a logical volume ID "Volume 1", when one third of the time period from the time that the logical volume was first assigned until the established date/time has elapsed, the CPU 5030 monitoring the movement date/time 50517 corresponding to the volume movement information (availability) ID "3" reads in the fact that the movement number 50516 is "2" and the movement date/time 50517 is "(established date/time–creation date)/3", and it acquires the value "medium" for the movement destination availability characteristics 50564 corresponding to the same.

Thereupon, the CPU 5030 refers to the physical storage region characteristics table 5048, and acquires a value of "1100" for the storage device ID 50481 and a value of "1162" for the physical storage region ID 50482 corresponding to the combination of a "low" entry in the performance characteristics 50483 and a "medium" entry in the availability characteristics 50484.

The CPU 5030 sends a request for the logical volume having a logical volume ID "Volume 1" to be moved to the physical storage region corresponding to the storage device ID "1100" and the physical storage region ID "1162", to the high-end storage device 1000, via the management I/F 5020 and the management I/F 1020.

When the storage device control section 1040 of the high-end storage device 1000 receives the movement request for the logical volume, the CPU 1041 processes the request in accordance with the volume movement program 1044. The CPU 1041 refers to the external storage region flag table 1047 and the external logical volume table 1048 in the memory 1045, and acquires information indicating that the logical volume having a logical volume ID of "Volume 1" is the logical volume "Volume 3" of the external storage device "1100".

Thereupon, if it is judged that movement is necessary, the CPU 1041 recognizes that the storage device ID contained in the request is "1100", and sends a request for the data of the logical volume "Volume 3" of the mid-range storage device 1100 to be copied to the physical storage region 1162 in the mid-range storage device 1100, via the external connection I/F 1030 and the storage I/F 1110.

When the storage device control section 1140 of the mid-range storage device 1100 receives a data copy request, the CPU 1141 writes the data in the logical volume "Volume 3" to the address "0–1023" of the physical storage region 1162, in accordance with the volume movement program 1144.

Next, the CPU 1141 changes the physical storage region ID 11463 corresponding to the logical volume ID 11461 value of "Volume 3" in the logical/physical mapping table 1146, to "1162", and changes the value of the address in physical storage region 11464 to "0–1023".

(Second Movement of Logical Volume "Volume 1")

Next, the movement step 7052 in the logical volume movement illustrated in FIG. 2 will be described in detail.

With respect to the logical volume having a logical volume ID "Volume 1", when one third of the time period from the time that the logical volume was first assigned until the established date/time has elapsed, the CPU 5030 monitoring the movement date/time 50563 corresponding to the volume movement information (availability) ID "3" reads in the fact that the movement number 50562 is "3" and the movement date/time 50563 is "(established date/time–creation date)×⅔", and it acquires the value "high" for the movement destination availability characteristics 50564 corresponding to same.

Thereupon, the CPU 5030 refers to the physical storage region characteristics table 5048, and acquires a value of "1100" for the storage device ID 50481 and a value of "1161" for the physical storage region ID 50482 corresponding to the combination of a "low" entry in the performance characteristics 50483 and a "high" entry in the availability characteristics 50484.

In a similar manner, the CPU 5030 sends a request for the logical volume having a logical volume ID "Volume 1" to be moved to the physical storage region corresponding to the storage device ID "1100" and the physical storage region ID "1161", to the high-end storage device 1000.

Thereby, the logical volume is moved in the high-end storage device 1000, and in the mid-range storage device 1100, the physical storage region ID 11463 corresponding to the logical volume ID 11461 value "Volume 3" in the logical/physical mapping table 1146 is changed to "1161", and the address in physical storage region value is changed to "1024–2047".

(Third Movement of Logical Volume "Volume 1")

Next, the movement step 7053 in the logical volume movement illustrated in FIG. 2 will be described in detail.

With respect to the logical volume having a logical volume ID "Volume 1", at a time three days before the date and time in the established date/time 50493, the CPU 5030 monitoring the movement date/time 50513 corresponding to the volume movement information (performance) ID "3" reads in the fact that the movement number 50512 is "2" and the movement date/time 50513 is "established date/time–3", and it acquires the value "high" for the movement destination performance characteristics 50514 corresponding to same.

Thereupon, the CPU 5030 refers to the physical storage region characteristics table 5048, and acquires a value of "1000" for the storage device ID 50481 and a value of "1061" for the physical storage region ID 50482 corresponding to the combination of a "high" entry in the performance characteristics 50483 and a "high" entry in the availability characteristics 50484.

The CPU 5030 sends a request for the logical volume having a logical volume ID "Volume 1" to be moved to the physical storage region corresponding to the storage device ID "1000" and the physical storage region ID "1061", to the high-end storage device 1000, via the management I/F 5020 and the management I/F 1020.

When the storage device control section 1040 of the high-end storage device 1000 receives the movement request for the logical volume, the CPU 1041 processes the request in accordance with the volume movement program 1044.

The CPU 1041 refers to the external storage region flag table 1047 and the external logical volume table 1048 in the memory 1045, and it acquires information indicating that the logical volume having a logical volume ID of "Volume 1" is the logical volume "Volume 3" of the external storage device "1100".

Thereupon, the CPU 1041 recognizes that the storage device ID contained in the request is "1000", and it acquires the data in the logical volume "Volume 3" from the mid-range storage device 1100 via the external connection I/F 1030 and the storage I/F 1110. The volume movement means 1044 writes the acquired data to the address "0–1023" of the physical storage region 1061.

Thereupon, the CPU 1041 sets a value of "0" for the external storage region flag 10472 corresponding to a logical volume ID 10471 of "Volume 1" in the external storage region flag table 1047. Furthermore, the CPU 1041 deletes the information corresponding to the logical volume ID 10481 value "Volume 1" from the external logical volume table 1048. Thereupon, the CPU 1041 adds information to the logical/physical mapping table 1046, indicating a logical volume ID 11461 of "Volume 1", a parity group ID 10462 of "10462", a physical storage region ID 10463 of "1061" and an address in physical storage region 10464 of "0–1023".

(Fourth Movement of Logical Volume "Volume 1")

Next, the movement step 7054 in the logical volume movement illustrated in FIG. 2 will be described in detail.

With respect to the logical volume having a logical volume ID "Volume 1", at a time one day after the date and time in the established date/time 50493, the CPU 5030 monitoring the movement date/time 50513 corresponding to the volume movement information (performance) ID "3" reads in the fact that the movement number 50512 is "3" and the movement date/time 50513 is "established date/time+1", and it acquires the value "low" for the movement destination performance characteristics 50514 corresponding to same.

Moreover, in a simultaneous fashion, the CPU 5030 monitoring the movement date/time 50517 corresponding to the volume movement information (availability) ID of "3" reads in the fact that the movement number 50562 is "4" and that the movement date/time 50563 is "established date/time+1", and it acquires the value "low" for the movement destination performance characteristics 50564 corresponding to the same.

Thereupon, the CPU 5030 refers to the physical storage region characteristics table 5048, and it acquires a value of "1100" for the storage device ID 50481 and a value of "1163" for the physical storage region ID 50482 corresponding to the combination of a "low" entry in the performance characteristics 50483 and a "low" entry in the availability characteristics 50484.

In a similar manner, the CPU 5030 sends a request for the logical volume having a logical volume ID "Volume 1" to be moved to the physical storage region corresponding to the storage device ID "1100" and the physical storage region ID "1163", to the high-end storage device 1000.

The CPU 1041 of the high-end storage device 1000, upon receiving this movement instruction, commands the mid-range storage device 1100 to perform movement of the logical volume. Thereupon, the CPU 1141 of the mid-range storage device 1100, upon receiving this instruction, adds information to the logical/physical mapping table 1146, indicating a logical volume ID 11461 of "Volume 3", a parity group ID 10462 of "1160", a physical storage region ID of "1163" and an address in physical storage region of "1024–2047".

Thereupon, the CPU 1041 of the high-end storage device 1000 sets a value of "1" for the external storage region flag 10472 corresponding to a logical volume ID 10471 of "Volume 1" in the external storage region flag table 1047. It also adds information to the external logical volume table 1048 indicating an logical volume ID 10481 of "Volume 1", a storage device ID 10482 of "1100", and an external logical volume ID 10483 of "Volume 3". Furthermore, information relating to the logical volume ID 10461 "Volume 1" is deleted from the logical/physical mapping table 1046.

(Movement of Logical Volume "Volume 2")

Logical volume movement is performed similarly for a logical volume having the logical volume ID "Volume 2", also. FIG. 19 is a diagram illustrating the volume movement for Volume 2.

The logical volume 7100 is a logical volume identified by the logical volume ID "Volume 2" in the high-end storage device 1000. As shown in the logical volume/data attribute table 5055 in FIG. 18, this is a mail log with an established date/time of 7/15; and, as shown in the data attribute/change characteristics table 5054 in FIG. 16, the corresponding value of the performance change characteristics ID 50542 is "1" and that of the availability change characteristics ID 50543 is "2".

More specifically, the volume movement information (performance) ID 50511 in the volume movement information table (performance) 5051 in FIG. 12B, that is indicated by the volume movement information ID 50494 in the performance change characteristics table 5049 in FIG. 12A, has a value of "1". Furthermore, the volume movement information (availability) ID 50561 in the volume movement information table (availability) 5056 in FIG. 14(B), that is indicated by the volume movement information ID 50404 in the availability change characteristics table 5050 in FIG. 14(A), has a value of "2".

Consequently, the logical volume 7100 having a logical volume ID of "Volume 2" is moved in accordance with the volume movement information (performance) ID 50511 of "1" and the volume movement information (availability) ID 50561 of "2".

The logical volume 7100 is assigned initially to a physical storage region 1061 which has both high performance and high availability. This assignment can be instructed by the user, for example, or it may be carried out by moving the logical volume upon the first judgment operation after allocation, as in the case of "Volume 1".

Subsequently, when one third of the time period from the time of first assignment until the established date/time, "storage end date", has elapsed, the logical volume 7100 is moved to the physical storage region 1071 which has "medium" performance and "high" availability (movement step 7151).

Thereupon, at the established date/time, "change storage conditions", the logical volume 7100 is moved to the physical storage region 1073 which has "medium" performance and "low" availability (movement step 7152).

Thereupon, when two thirds of the time period from the time of first assignment until the established date/time, "storage end date", has elapsed, the logical volume 7100 is moved to the physical storage region 1163 which has "low" performance and "low" availability (movement step 7153).

The detailed processing carried out in the high-end storage device 1000 and the mid-range storage device 1100 during movement of the logical volume is similar to that in the case of "Volume 1" described above, and a repeated description is therefore omitted here.

In the procedures for moving logical volumes as described above, the timing at which to move a logical volume is calculated by the management server 5000 in the form of a specific date and time, by a calculating function provided in the management server 5000, at prescribed time intervals, on the basis of the movement date/time acquired from the volume movement information table (performance) 5051 and the volume movement information table (availability) 5056, the time thus calculated is compared with the current time to determine whether a timing has been reached at which a logical volume should be moved.

The method for monitoring and determining the movement timing is not limited to this. For example, it is also possible to adopt the following composition.

Firstly, when the performance characteristics table 5049 and the availability characteristics table 5050 have been created, the management server 5000 calculates the absolute date and time of the timing at which movement is to be carried out on the basis of the movement date/time 50513 in the volume movement information table (performance) 5051, and the movement date/time 50563 in the volume movement information table (availability) 5056, and then it generates a movement schedule table 5057 as illustrated in FIG. 24. The movement schedule table 5057 comprises, for each logical volume, a data attribute stored in that logical volume, the creation date thereof, the established date/time, the movement date/time storing the absolute date/time for movement calculated from the volume movement information table (performance) 5051 and the volume movement information table (availability) 5056, and the performance and availability required of the destination physical storage region at the stated movement date/time.

At prescribed time intervals, the CPU 5030 of the management server 5000 determines whether or not a timing at which movement must be performed has been reached, by comparing the movement date/times in the movement schedule table 5057 with its own internal clock.

Furthermore, in the present embodiment, relocation is achieved by copying the data in a logical volume to an optimal storage region, in accordance with the previously determined temporal change in performance and availability for respective data attributes, but the invention is not limited to this. For example, it is also possible to adopt a composition wherein the characteristics of the actual physical storage region in which the logical volume is located are changed to desired characteristics, by means of back-up processing, replication processing, caching, or the like, as described above.

In many cases, the temporal change in the performance and availability required of the storage destination, by the data to be stored by the application server in a storage device in this way, is divided previously according to the type of data. In the present embodiment, logical volumes are assigned to an optimal physical storage region at the optimal timing on the basis of the characteristics of the data to be stored therein.

According to the present embodiment as described above, it is possible to assign a logical volume to an optimal physical storage region, at an optimal timing, in accordance with previously determined temporal change in the performance and availability required by the logical volume, depending on the type of data stored in the logical volume, without having to monitor the actual access frequency and predict future access operations on the basis of these monitoring results.

If there are a plurality of high-end storage devices managed by the management server via the management I/F 5020, then the logical volume ID 50551 in the logical volume/data attribute table 5055 is an identifier which identifies the high-end storage device and a logical volume within that high-end storage device.

Second Embodiment

Next, a second embodiment of the present invention will be described.

Figure 20:
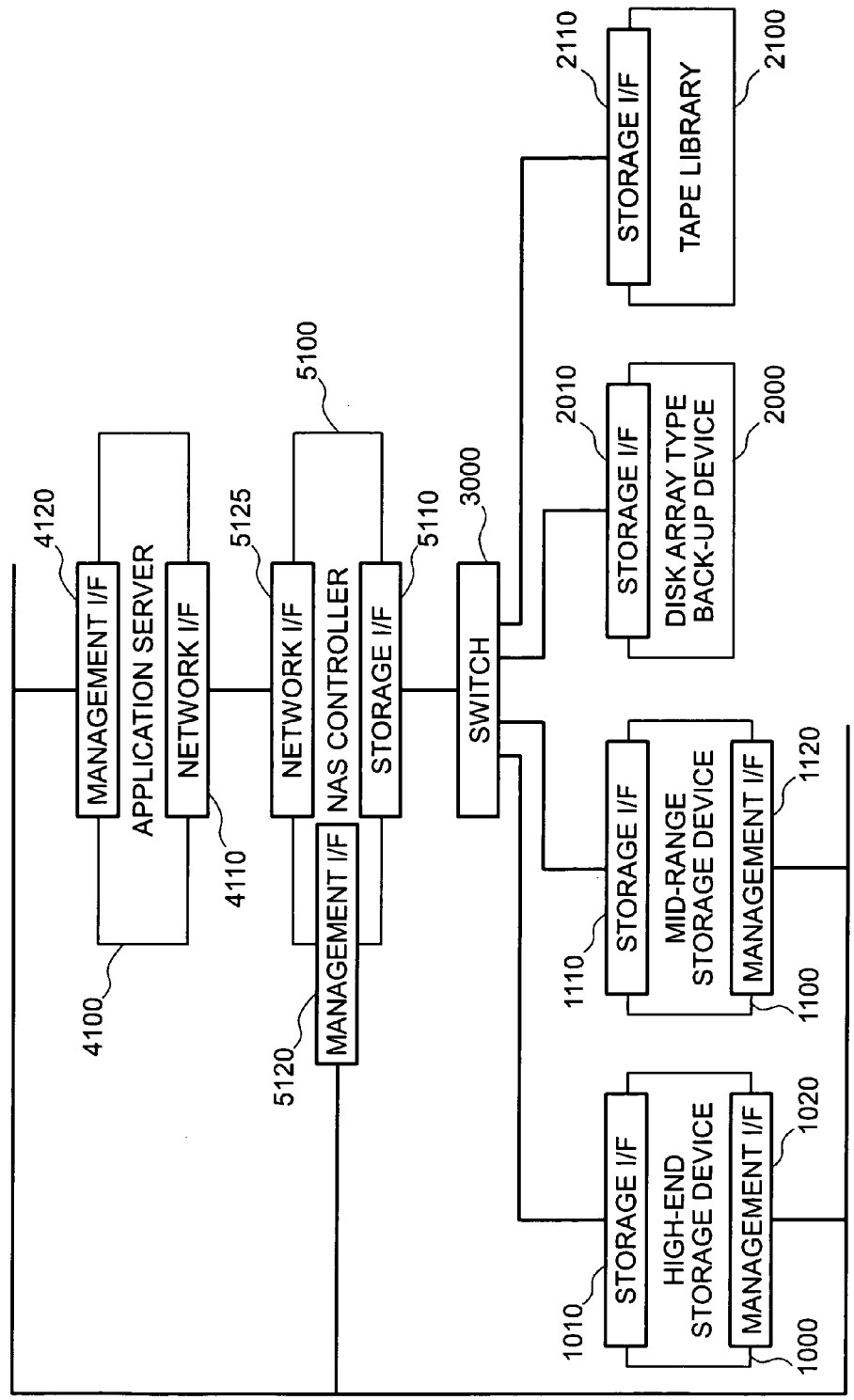
FIG. 20 is a block diagram of an information processing system according to a second embodiment of the invention.

FIG. 20 is a block diagram of an information processing system according to the present embodiment.

As this diagram shows, the information processing device according to the present embodiment comprises a high-end storage device 1000, a mid-range storage device 1100, a disk array type back-up device 2000, a tape library 2100, a switch 3000, an application server 4100, and a NAS controller 5100.

The high-end storage device 1000 and the mid-range storage device 1100 have similar compositions to those of the first embodiment, being storage devices for storing data used by the application server 4100.

The disk array type back-up device 2000 and the tape library 2100 respectively have the same composition as those of the first embodiment, being storage devices for backing up the data stored in the high-end storage device 1000 and the mid-range storage device 1100.

The NAS controller 5100 is a computer device providing network file services to the application server 4100. As shown in the diagram, the NAS controller 5100 comprises a storage I/F 5110 connected to a storage I/F 1010 of the high-end storage device 1000 and a storage I/F 1110 of the mid-range storage device 1100, via the switch 3000, a network I/F 5125 connected to the application server 4100, and a management I/F 5120 connected to the management I/F 1020 of the high-end storage device 1000 and the mid-range storage device 1100.

The NAC controller 5100 has a file system for the data stored in the high-end storage device 1000 and the mid-range storage device 1100, and it provides network file services by using this file system. In the present embodiment, data is moved in file units by using this function of the NAS controller 5100.

The application server 4100 is a computer device which executes an application program using data stored in the high-end storage device 1000 and the mid-range storage device 1100. The application server 4000 accesses the data stored in the high-end storage device 1000 and the mid-range storage device 1100 by means of the network file service provided by the NAS controller.

Similar information to that in the memory 5040 of the management server 5000 in the first embodiment is held in the memory of the NAS controller 5100.

In the present embodiment, however, since the data is moved in file units, the item name of the volume movement information ID 50494 in the performance change characteristics table 5049 is a file movement information ID, and the item name of the volume movement information ID 50504 in the availability change characteristics table 5050 is also a file movement information ID.

Furthermore, the name of the volume movement information table (performance) 5051 is a file movement information table (performance), and the name of the volume movement information table (availability) 5056 is a file movement information table (availability). Moreover, the item names in the volume movement information (performance) ID 50511 and the volume movement information (availability) ID 50561 are, respectively, file movement information (performance) ID, and file movement information (availability) ID.

A file attribute table 5055a is provided instead of the logical volume/data attribute table 5055. The file attribute table 5055a contains the item, file name 50551a, instead of the logical volume ID 50551 in the logical volume/data attribute table 5055, and the data attribute of the data of the file is held as the data attribute 50552a.

Figures 22, 23:
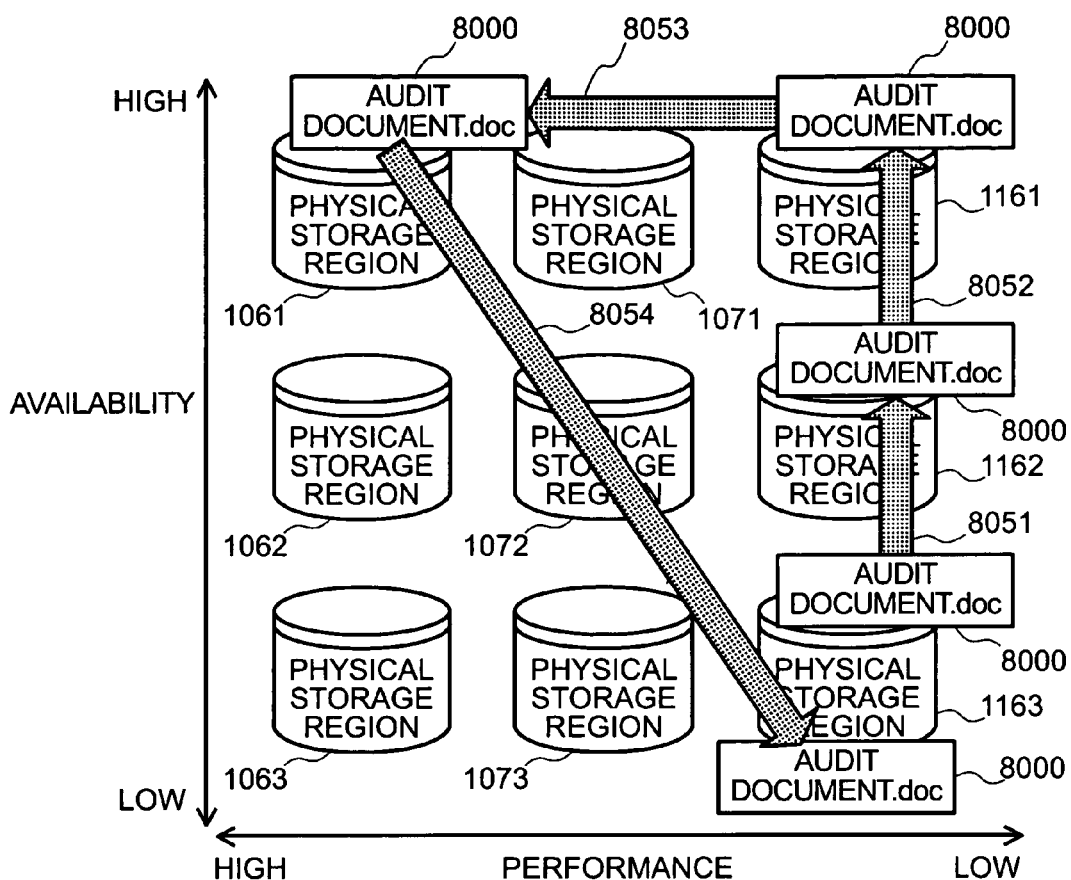
FIG. 22 is a diagram illustrating the movement of files according to the second embodiment of the invention.
FIG. 23 is a diagram showing the composition of a file system table according to the second embodiment of the invention.

Moreover, in addition to this, a file system table 5156 is also held in the memory of the NAS controller 5100. One example of the composition of a file system table 5156 is shown in FIG. 23. As this diagram shows, the file system table 5156 comprises a file name 51561, a storage device ID 51562, a physical storage region ID 51563, and an address in physical storage region 51564.

The file name 51561 is an identifier for identifying a file. The storage device ID 51562 is an identifier for the storage device in which the data of the file identified by the file name 51561 is located. The physical storage region ID 51563 is an identifier for the physical storage region ID in which the data of the file identified by the file name 51561 is located. The address in physical storage region 51564 is an address representing the position within the physical storage region at which the data of the file identified by the file name 51561 is located.

By means of this file system table 5156, the NAS controller 5100 is able to identify the storage device and the physical storage region in which each file is stored.

An overview of the processing according to the present embodiment is now described with reference to FIG. 21 and FIG. 22. The file name 8040, the data attribute 8010, and the performance change characteristics 8020 and availability change characteristics 8030 required of the storage destination by the file having the relevant data attribute will be described, for instance, by taking the case illustrated in FIG. 21 as an example. These correspond respectively to the data attribute 7010, the performance change characteristics graph 7020, the availability change characteristics graph 7030 and the logical volume ID 7040 according to the first embodiment.

Figure 21:
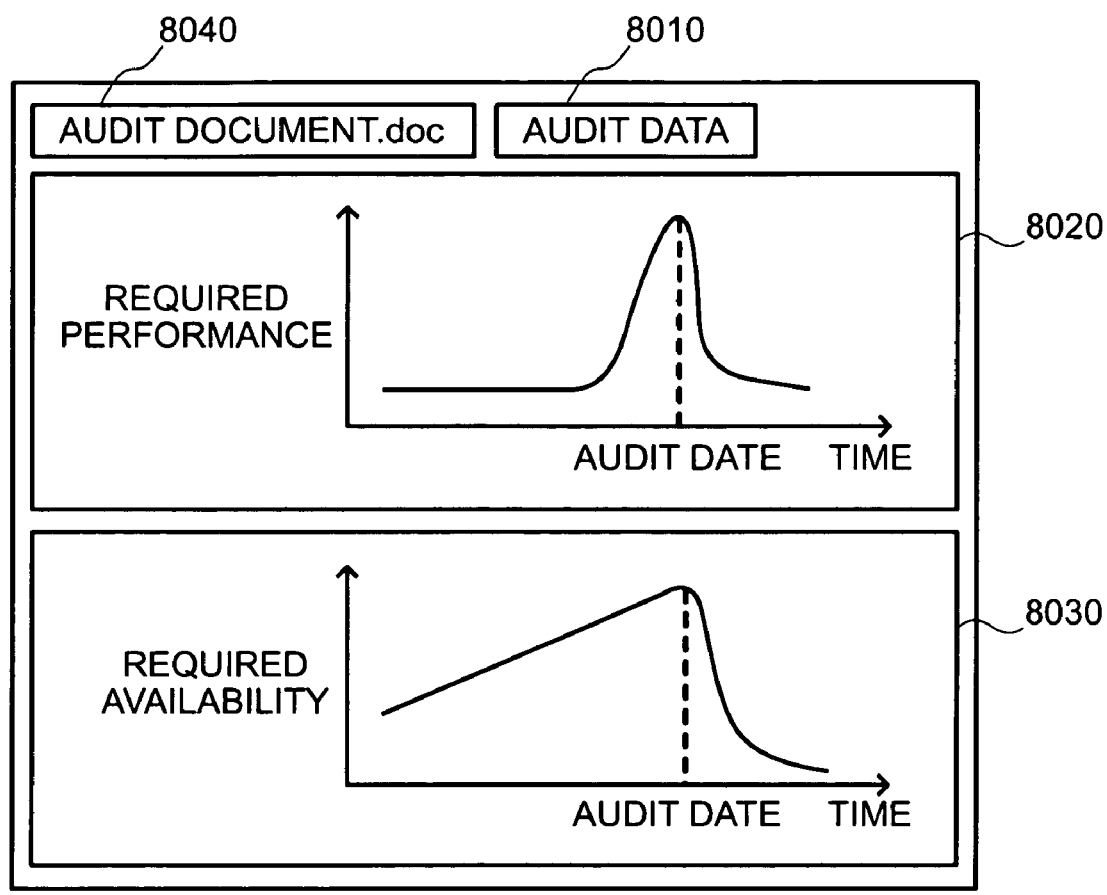
FIG. 21 is a diagram illustrating an overview of the processing according to the second embodiment of the invention.

FIG. 22 is a diagram showing how a file is moved between physical storage regions of the storage device, in accordance with the file, the data attribute thereof, and the characteristics of the data attribute illustrated in FIG. 21. In this diagram, the file 8000, movement step 8051, movement step 8052, movement step 8053, and movement step 8054 are respectively equivalent to the logical volume 7000, movement step 7051, movement step 7052, movement step 7053 and movement step 7054 according to the first embodiment.

However, in the first embodiment, the volume movement was controlled in accordance with a volume movement program 1044 of the high-end storage device 1000. In contrast, in the present embodiment, the NAS controller 5100 has file movement means, and the file movement is controlled by the file movement means of the NAS controller 5100.

In the first embodiment, when a volume has been moved, the CPU 1041 rewrites the logical/physical mapping tables 1046, 1146, and the like, in the high-end storage device 1000 and the mid-range storage device 1100 in accordance with the volume movement program 1044. However, in the present embodiment, when a file has been moved, the file movement means of the NAS controller 5100 rewrites the file system table 5156 in the NAS controller 5100.

Moreover, in the first embodiment, an logical volume allocation screen 9000 is used when assigning the logical volumes, but in the present embodiment, a similar "file creation screen" is used when creating the files. In the "file creation screen", the "logical volume ID" display element in the logical volume allocation screen 9000 is replaced by a "file name" display element, and the logical volume ID box 9100 is replaced by a file name box.

As described above, the NAS controller 5100 operates similarly to the management server 5000 in the first embodiment, and it manages the data in file units in such a manner that a file is located in an optimal physical storage device in accordance with a change in the performance and availability required by the data in that file.

According to the present embodiment as described above, it is possible to assign data in file units to an optimal physical storage region, at an optimal timing, in accordance with a previously determined temporal change in the performance and availability required by that data, depending on the type of data stored, without having to monitor the actual access frequency and to predict future access operations on the basis of these monitoring results.

What is claimed is:

1. An information processing system comprising:
    at least one computer device;
    at least one storage device having a plurality of physical storage regions for storing data used by said computer device;
    physical storage region characteristics managing means for managing a level of storage characteristics provided by each of said plurality of physical storage regions;
    data storage destination managing means for managing associations between said plurality of physical storage regions and data stored in each physical storage region;
    characteristics change managing means for managing previously determined temporal change in the level of the storage characteristics required of said storage destination physical storage region by the data managed by said data storage destination managing means; and
    movement instructing means for acquiring, at prescribed times, the level of storage characteristics in a storage destination required by the data at that time, for each data item managed by said data storage destination managing means, further acquiring the level of storage characteristics of said physical storage region in which said data is actually stored, from said physical storage region characteristics managing means, comparing said respective levels, and issuing an instruction to said storage device for said data to be moved to said physical storage region providing said required storage characteristics,
    wherein said characteristics change managing means comprises:
    a plurality of patterns of the temporal change in the level of said storage characteristics, and
    wherein the timing of said temporal change is established in accordance with a pattern and a date and time specified by the user.

2. The information processing system according to claim 1,
    wherein said storage characteristics are performance indicating the speed of processing, and availability indicating the speed of recovery.

3. The information processing system according to claim 1, further comprising:
    physical storage region characteristics establishing means for establishing a level of said storage characteristics in each of said physical storage regions based on processing carried out with respect to each of said physical storage regions.

4. The information processing system according to claim 3, wherein said storage region characteristics establishing means comprises:

replicate generating means for generating a replicate of the data stored in said physical storage region; and caching means for placing the data stored in said physical storage region on a cache, as resident data.

5. The information processing system according to claim 4, wherein reproduction generating means sets the replicated data to have high availability, and wherein said caching means sets the data placed on the cache to have high performance.

6. The information processing system according to claim 1, further comprising:

data movement means for moving said data to said physical storage region having the required storage characteristics for storing said data in accordance with instructions from said movement instructing means.

7. The information processing system according to claim 6, wherein the data storage destination managing means manages the logical storage regions accessed directly by said computer device which issues requests relating to said data and information associating said logical storage regions and the physical storage regions in which said data is stored and wherein said movement instructing means acquires the level of said storage characteristics, for each data item, and for each of said logical storage regions, and if said levels do not match, then it issues a movement instruction for said logical storage region unit.

8. The information processing system according to claim 6, further comprising:

data storage destination updating means for updating the information managed by said data storage destination managing means in such a manner that said data is associated with said physical storage region after movement.

9. An information processing system according to claim 1, wherein said storage device further includes logical storage regions accessible to said at least one host computer device;

logical/physical mapping information storing means for storing logical/physical mapping information creating associations between said logical storage regions and said physical storage regions;

data movement means for moving the data in said physical storage region associated with a prescribed one of said logical storage regions to another of said physical storage regions in accordance with said instruction issued by said movement instructing means; and association changing means for changing said logical/physical mapping information in such a manner that said prescribed logical storage region is associated with the physical storage region after movement.

10. An information processing system according to claim 9, wherein said host computer device accesses, via said logical storage regions, to the data stored in the physical storage regions of other storage devices, and wherein said logical/physical mapping information storing means comprises:

logical/physical mapping information creating associations between said logical storage regions and the physical storage regions in said other storage devices.

11. A management computer device, comprising:

an interface connected via a network to a computer device and a storage device having a plurality of physical storage regions storing data used by said computer device; and a control unit section and a memory connected to said control section, wherein said memory holds levels of storage characteristics provided by each of said plurality of physical storage regions, and previously established temporal change in a level of the storage characteristics required of said physical storage regions forming storage destinations, by the data to be stored in said physical storage regions, wherein said control section compares the level of the storage characteristics of a storage destination required by the data at a particular time at prescribed times, for each data item, with the level of the storage characteristics of said physical storage region in which said data is actually stored, and if said levels are not matching, then it sends an instruction for said data to be moved to said physical storage region providing said required storage characteristics to the storage device having said physical storage region in which said data is actually stored, via said interface, wherein a plurality of patterns of the temporal change in the level of storage characteristics required of said storage regions are held in said memory, and wherein said control section establishes the timing of said temporal change, based on the selection of a prescribed pattern and specification of a date and time, and acquires the storage characteristics of the storage destination required by said data at that particular time, from said memory, in accordance the pattern thus established.

12. The management computer device according to claim 11, wherein a plurality of patterns of the temporal change of the level of storage characteristics required of said storage regions are held in said memory for each attribute of the data used by said computer device and wherein said control section acquires the level of storage characteristics of the storage destination required by said data at that time from said memory.

13. The computer-readable storage medium according to claim 10, further causing a computer to perform the functions of:

data replicating means for instructing replication of data stored in a particular physical storage region of the plurality of physical storage regions of a storage device managed by a management device controlled by said computer;

caching means for instructing that data stored in a particular physical storage region of the plurality of physical storage regions of a storage device managed by a management device controlled by said computer is to be placed on the cache as resident data; and storage characteristics level establishing means for establishing the respective storage characteristics levels of said plurality of physical storage regions, in accordance with processing carried out by said data replicating means and said data caching means.

14. A computer system, comprising:

a computer device connected to a network;

a management computer device having a first interface connected to the network and a first memory and first control section;

a first storage device comprising a second interface connected to said computer device via the network, a third interface connected to another external storage device, physical storage regions for storing data used by said computer device, a second control section and a second memory; and a second storage device comprising a fourth interface connected to said first storage device by the network, a third control section, physical storage regions storing data used by said computer device, and a third memory;

wherein said management computer device holds, in said first memory, levels of storage characteristics, including a performance indicating a processing speed and availability indicating a recovery speed, provided by each of said plurality of physical storage regions, and previously established temporal change in a level of storage characteristics required of said physical storage region forming a storage destination, by data stored in said physical region, wherein said first control section comprises a plurality of patterns of temporal change in the level of said storage characteristics, establishes timing of said temporal change in accordance with a pattern and date and time specified by a user, and compares the level of the storage characteristics of a storage destination required by data at a particular time, for each data item, at prescribed times, based on the timing thus established, with the level of the storage characteristics of said physical storage region in which said data is actually stored, and if said levels are not matching, then it sends an instruction for said data to be moved to said physical storage region providing said required storage characteristics, to the storage device having said physical storage region in which said data is actually stored, via said interface, wherein said first storage device holds, in said second memory, logical/physical mapping information for said first logical storage regions provided in order that said computer device can request data, and the physical storage regions actually located in said first storage device, in which said data is stored and associations between said first logical storage regions, the logical storage regions provided externally by said second storage device, and the physical storage regions in which said data is stored, wherein said control section receives said movement instructions via said second interface, and if said data movement is a movement between said first storage device and said second storage device, then it refers to said associations, and specifies the logical volume of said second storage device relating to said movement, by means of said third interface, as well as instructing movement of the data to said second storage device, and moves the data stored in said physical storage region to a designated physical storage region, in accordance with said instruction, and updates said logical/physical mapping information and said associations, in accordance with said movement, wherein said second storage device holds, in said third memory, associations between said logical storage regions provided externally and the physical storage regions in which said data is stored, and wherein said third control section receives a data movement instruction from said first storage device, via said fourth interface, and performs movement of said data.

* * * * *